United States Patent [19]

Cox et al.

[11] Patent Number: 5,021,940
[45] Date of Patent: Jun. 4, 1991

[54] SYNERGETIC AUTOMATIC CONTROL SYSTEM FOR PELLET MILL

[75] Inventors: George M. Cox, San Antonio; Charles D. Colley, Jr., Converse; Thomas E. Davis, Jr., San Antonio, all of Tex.

[73] Assignee: Automatic Control Electronics Company, San Antonio, Tex.

[21] Appl. No.: 296,493

[22] Filed: Jan. 12, 1989

[51] Int. Cl.⁵ .............................................. G06F 15/00
[52] U.S. Cl. .................................... 364/148; 364/468; 426/454; 241/34
[58] Field of Search ............... 364/468, 469, 502, 148, 364/476; 425/144; 426/454; 99/486, 487; 241/34, 35

[56] References Cited

U.S. PATENT DOCUMENTS

| | | | |
|---|---|---|---|
| 3,932,736 | 1/1976 | Zarow et al. | 235/151.1 |
| 4,327,871 | 4/1982 | Larsen | 241/18 |
| 4,340,937 | 7/1982 | Volk, Jr. | 364/468 |
| 4,463,430 | 7/1984 | Volk, Jr. et al. | 364/468 |
| 4,700,310 | 10/1987 | Volk, Jr. | 364/468 |
| 4,721,448 | 1/1988 | Irish et al. | 364/469 |
| 4,742,463 | 5/1988 | Volk, Jr. | 364/468 |
| 4,764,874 | 8/1988 | Volk, Jr. | 364/468 |
| 4,786,182 | 11/1988 | Larsen | 364/468 |

*Primary Examiner*—Allen R. MacDonald
*Attorney, Agent, or Firm*—Baker & Botts

[57] ABSTRACT

An apparatus and method for automatically controlling a pellet mill. Dry material from a feeder and steam from a valve are supplied to a conditioner, in which the dry material is mixed with the steam to form a hot and moist conditioned mash. The mash is fed into a motorized die or other pellet producing means. During operation, the current load of the die motor and the temperature in the pellet mill are continuously monitored. At period intervals, the system determines whether the current is within a certain tolerance of a predetermined target value. If the current is not within tolerance, the rate of input of raw material is increased or decreased. For each such change in input of raw material, an adjustment is made to the amount of steam input. If the current is within tolerance, the system determines whether temperature of the conditoned mash is near a predetermined target value, and if not, the system adjusts the steam input. The system also monitors the effects of preceding adjustments to predict and prevent a plugged die.

30 Claims, 19 Drawing Sheets

| PELLET MILL OIL PUMP | PELLET MILL MOTOR | CONDTN'R | FEEDER | PM NO. 1 SURGE BIN LOW | | | |
|---|---|---|---|---|---|---|---|
| RUNNING ◎ | RUNNING ◎ | RUNNING ◎ | RUNNING ◎ | ◎ | ◎ | ◎ | ◎ |
| ◎ ON | ◎ ON | ◎ ON | ◎ ON | ◎ ON | ◎ ON | ◎ ON | ◎ ON |
| SURGE BIN VIBRATE | MOTOR & OIL PUMP ENABLE | START | START | STEAM VALVE OPEN | QUICK DUMP OPEN | PELLET MILL #1 HORN ON | PELLET MILL #1 OVERRIDE |
| ⍜ AUTO OFF | ⍜ AUTO OFF | ⍜ AUTO OFF | ⍜ AUTO OFF | ⍜ AUTO CLOSE | ⍜ AUTO CLOSE | ⍜ AUTO OFF | ⍜ AUTO OFF |

────────── PELLET MILL NO. 1 ──────────

—121  —122

| PELLET FAT/ATO | | CRUMBLER BYPASS DIVERTER | | PELLET DISCHG CONVEYR | PELLET LEG | PELLET DISTRB. CONVEYR | DISTRB. CONV.GATE RE- BIN RUN 113 |
|---|---|---|---|---|---|---|---|
| FAT PUMP | SPRAY VALVE | BYPASS POSITION | CRUMBLER POSITION | | | | |
| RUNNING ◎ | GATEOPEN ◎ | ◎ | ◎ | RUNNING ◎ | RUNNING ◎ | RUNNING ◎ | GATE OPEN ◎ |
| ◎ ON | ◎ ON | ◎ ON | ◎ ON | ◎ ON | ◎ ON | ◎ ON | ◎ ON |
| START | OPEN | AUTO BYPASS  CRMBLER | | START | START | START | OPEN |
| ⍜ AUTO OFF | ⍜ AUTO OFF | | | ⍜ AUTO OFF | ⍜ AUTO OFF | ⍜ AUTO OFF | ⍜ AUTO CLOSE |

—123

| MOLASSES ADDITION | | AUX. #1 | AUX. #2 | AUX. #3 | AUX. #4 | AUX. #5 | AUX. #6 |
|---|---|---|---|---|---|---|---|
| MOLASSES PUMP | SPRAY VALVE | | | | | | |
| RUNNING ◎ | GATEOPEN ◎ | RUNNING ◎ | RUNNING ◎ | RUNNING ◎ | RUNNING ◎ | RUNNING ◎ | RUNNING ◎ |
| ◎ ON | ◎ ON | ◎ ON | ◎ ON | ◎ ON | ◎ ON | ◎ ON | ◎ ON |
| START | OPEN | START | START | START | START | START | START |
| ⍜ AUTO OFF | ⍜ AUTO CLOSE | ⍜ AUTO OFF | ⍜ AUTO OFF | ⍜ AUTO OFF | ⍜ AUTO OFF | ⍜ AUTO OFF | ⍜ AUTO OFF |

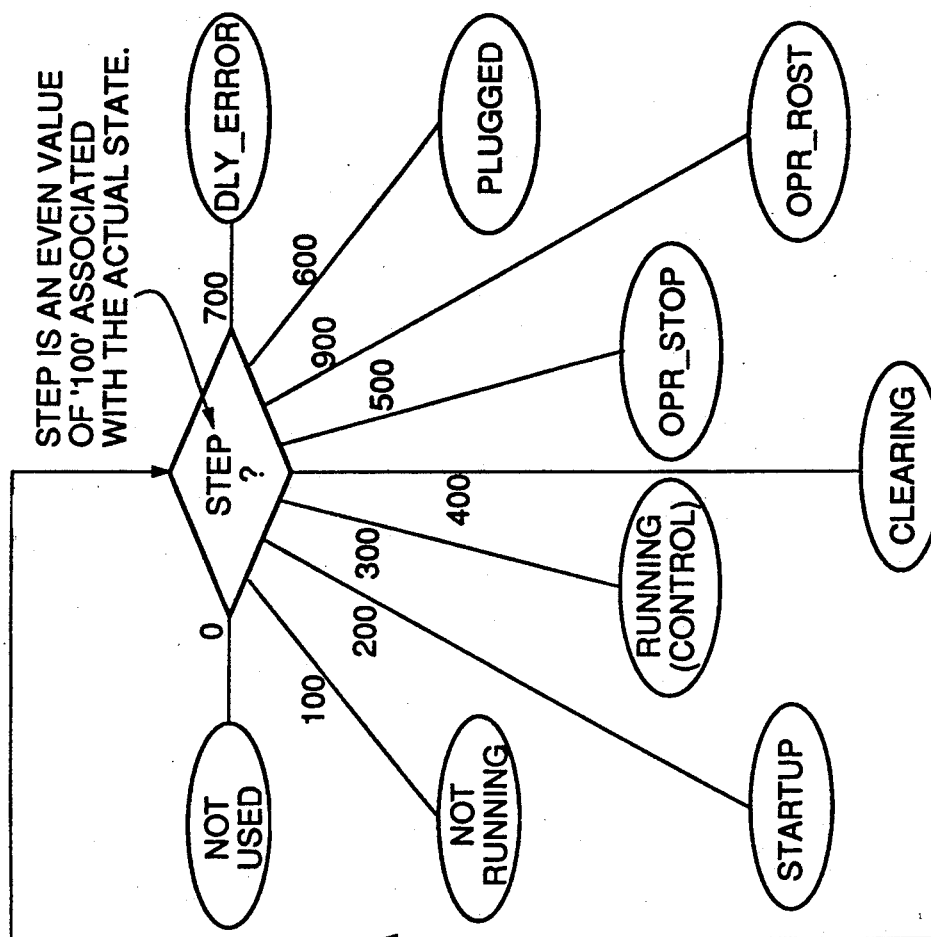
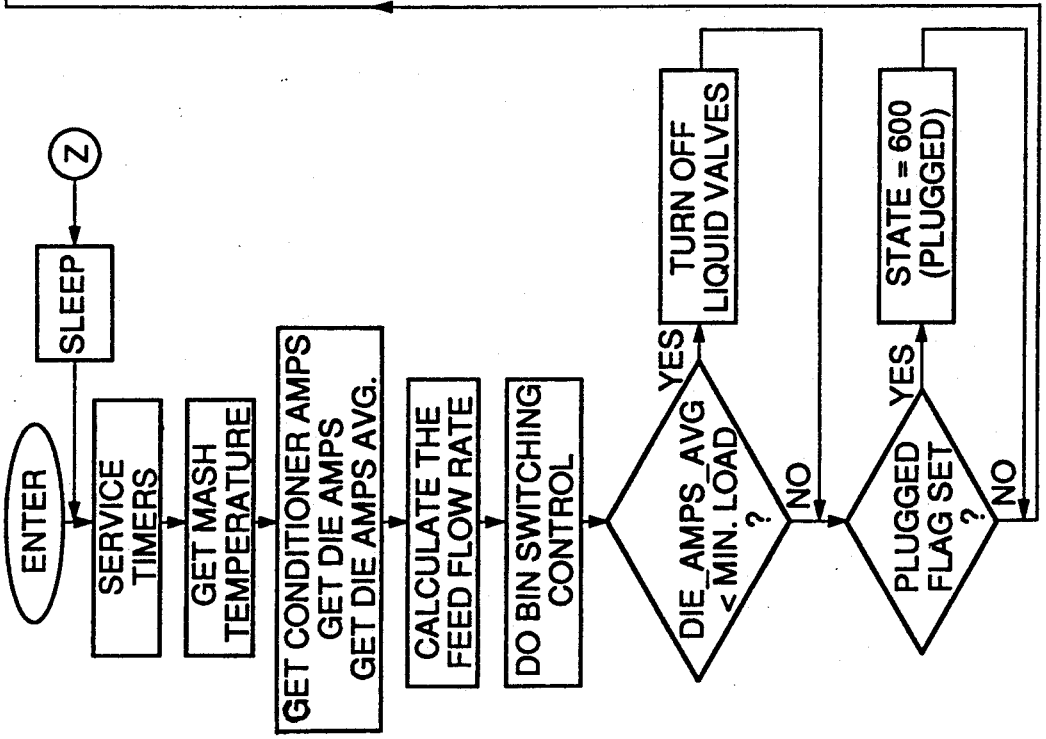
Fig. 4

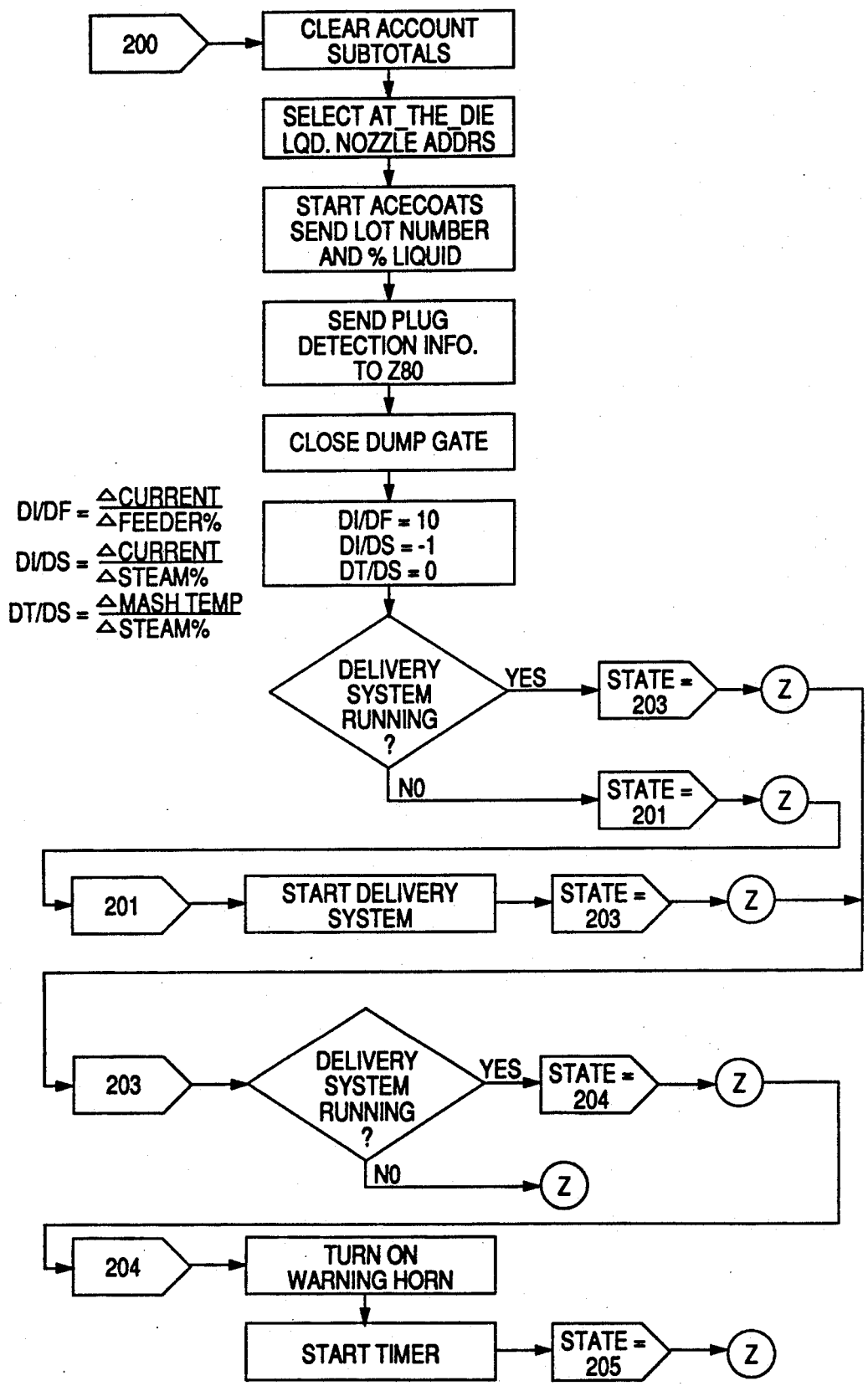
Fig. 5A(1)

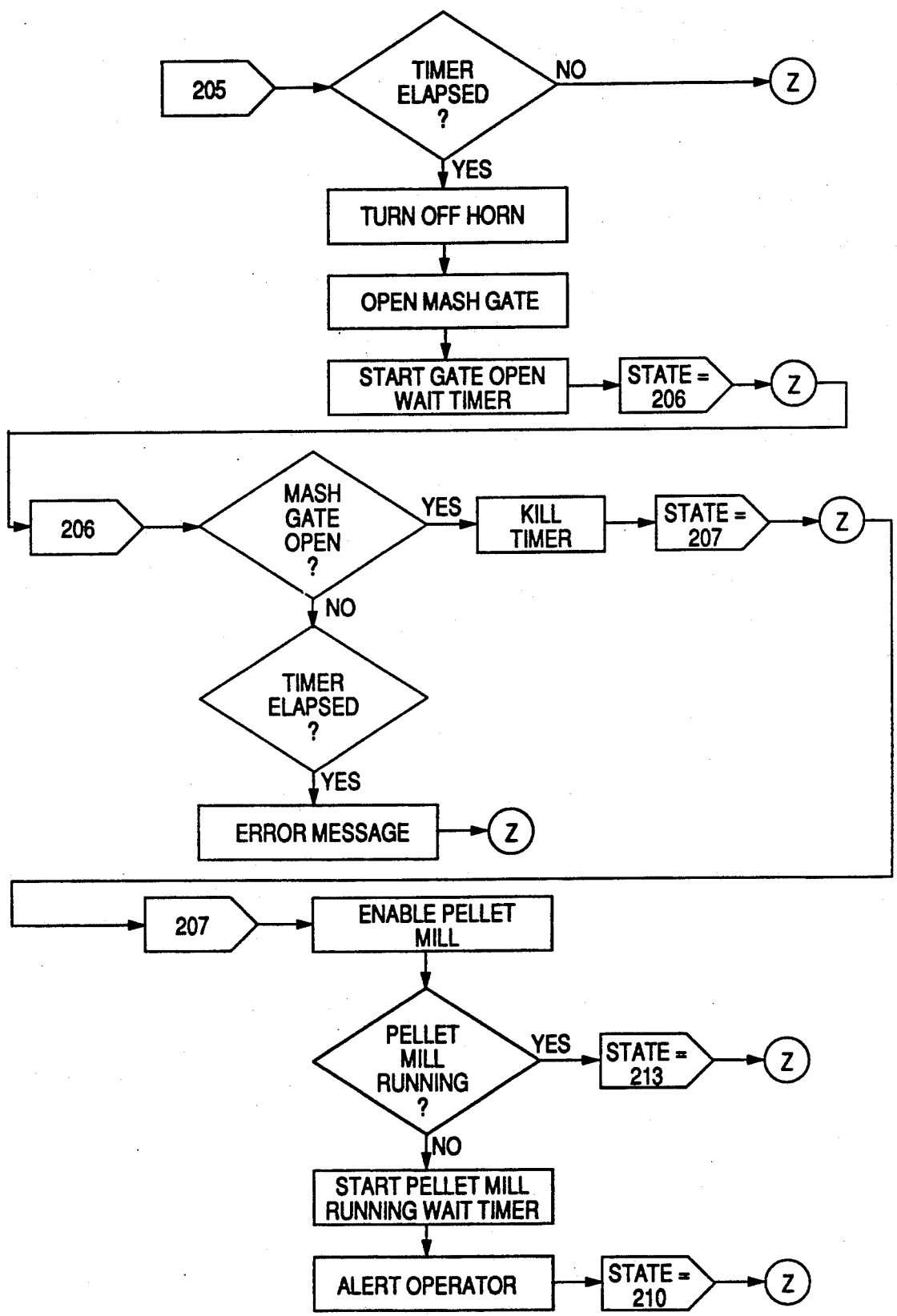
Fig. 5A(2)

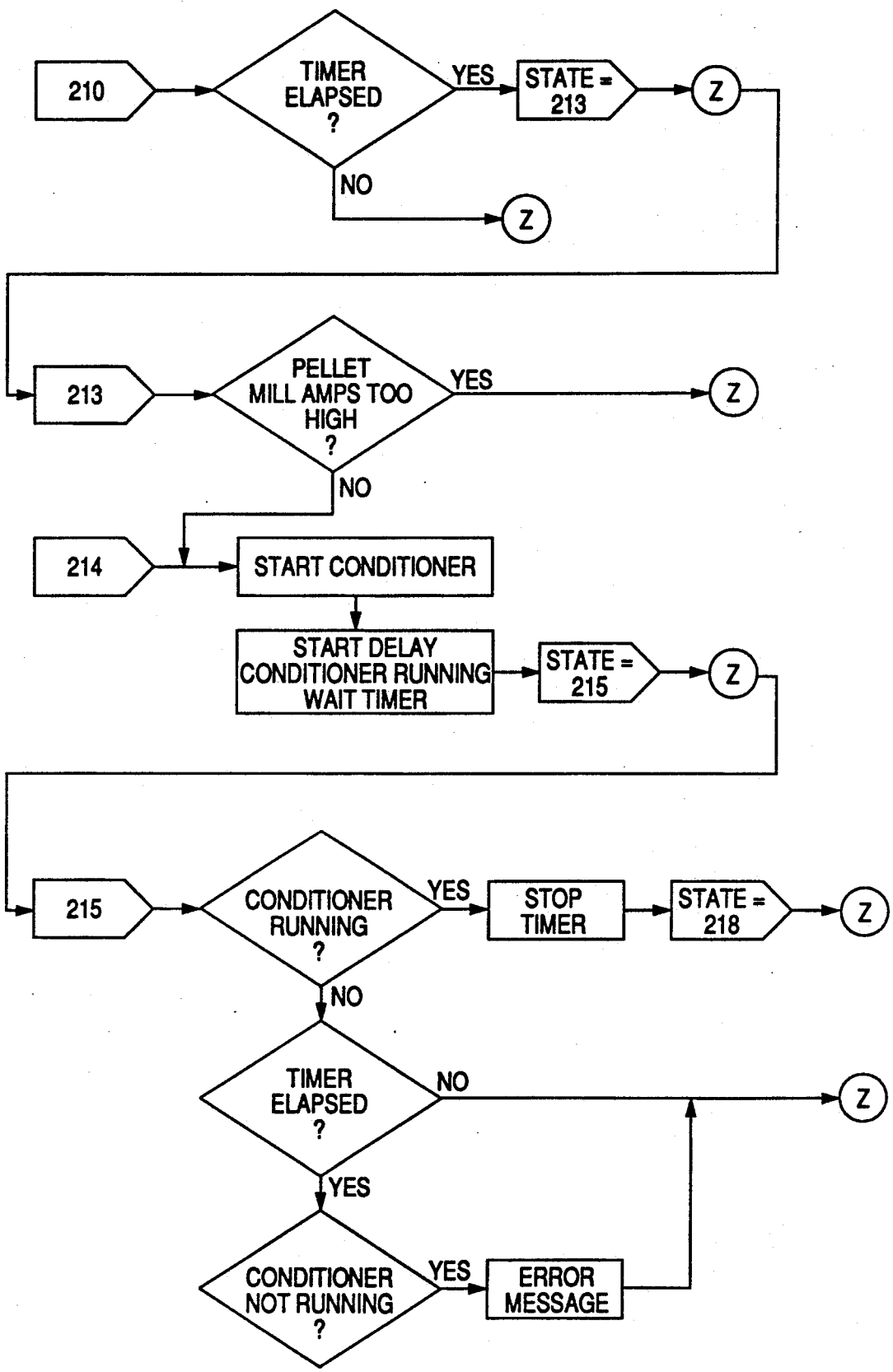
Fig. 5A(3)

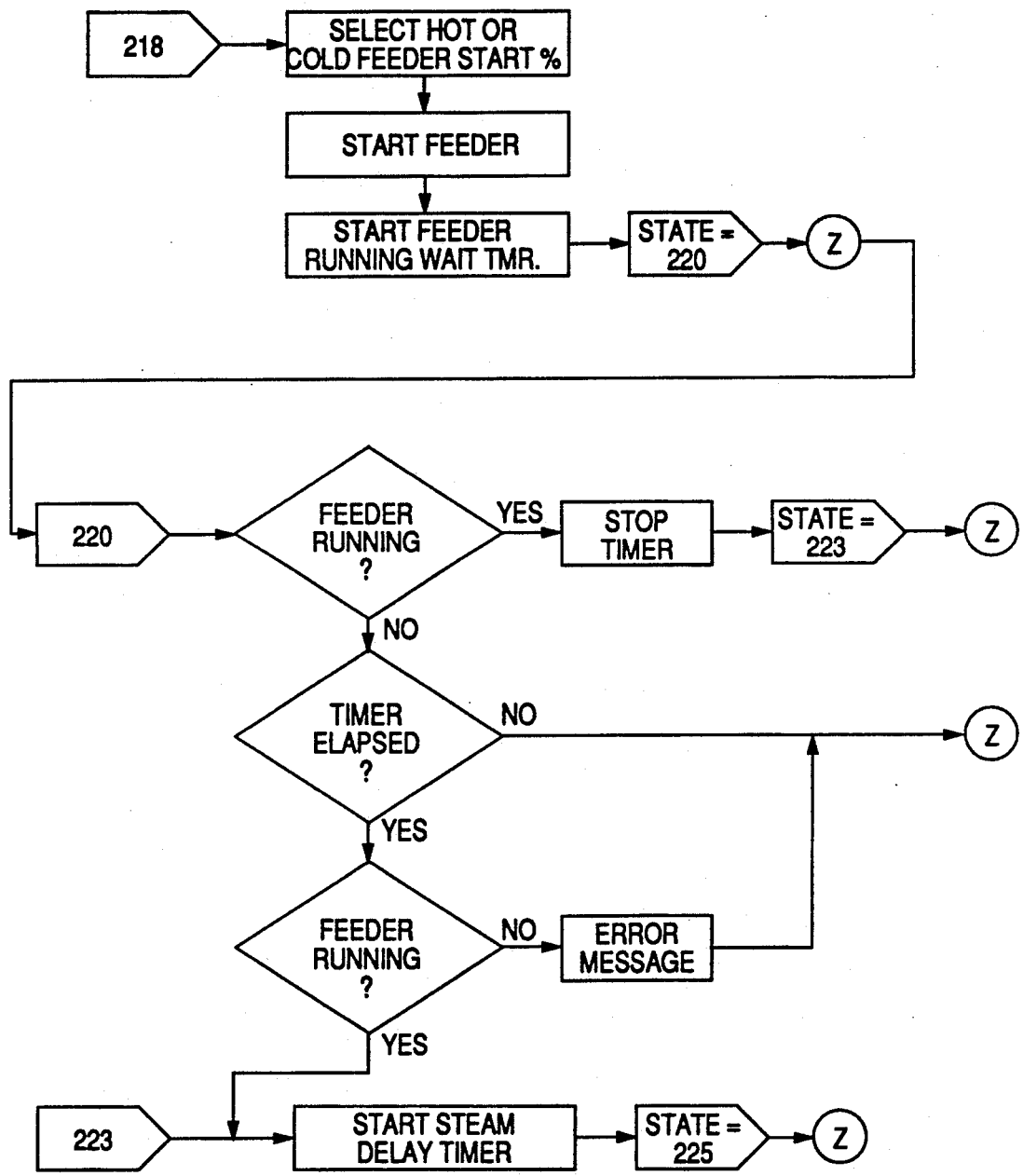
Fig. 5B(1)

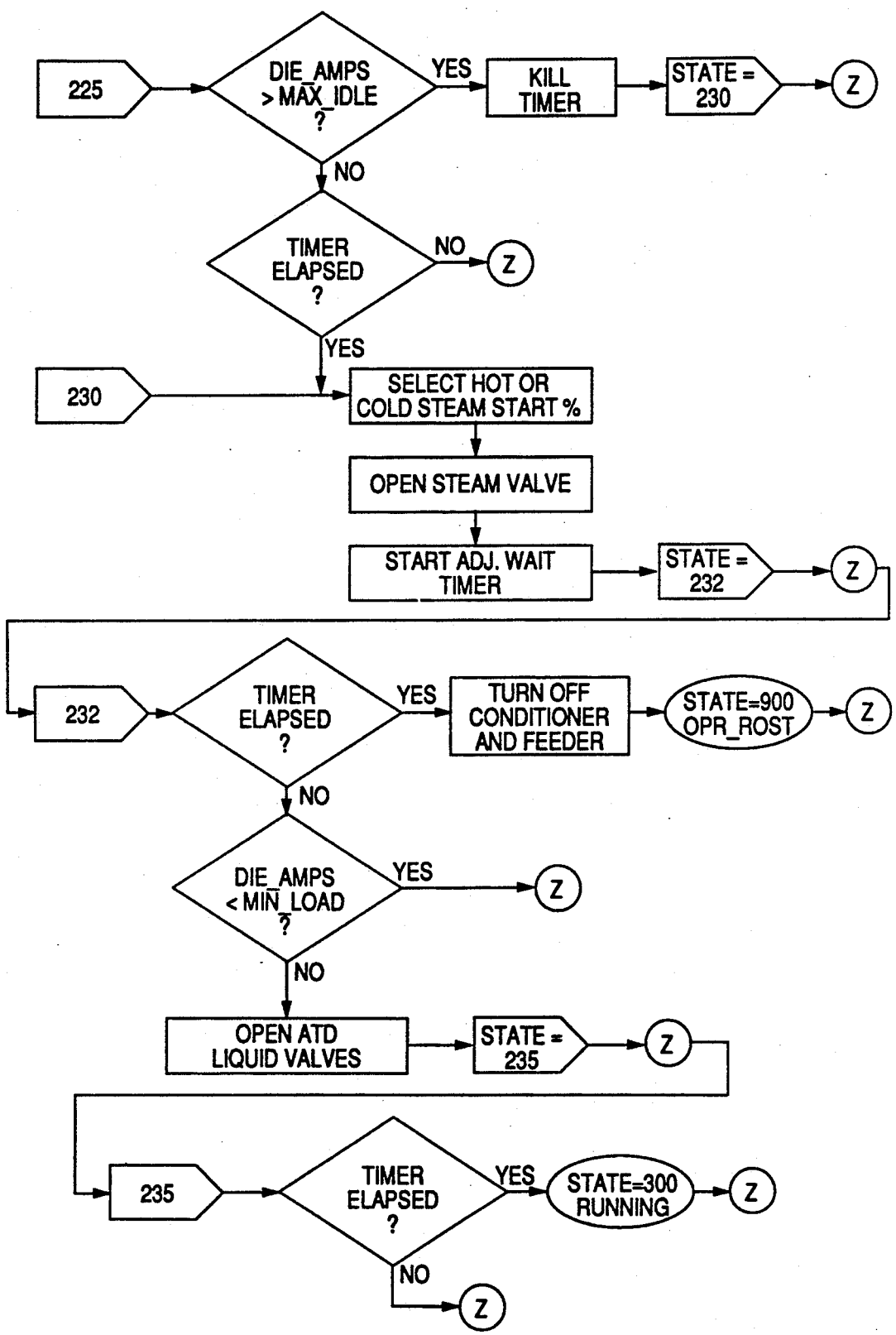
Fig. 5B(2)

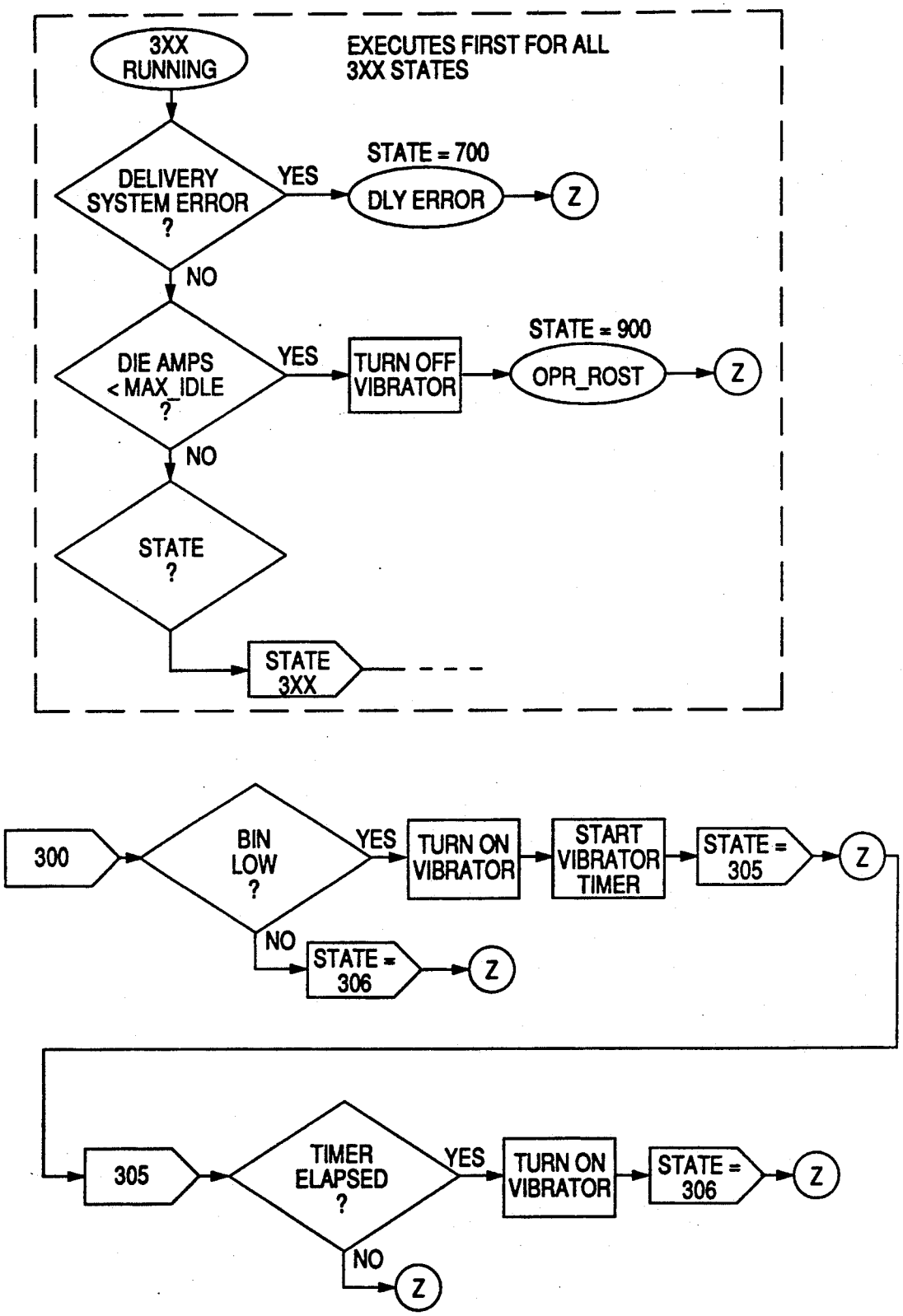
Fig. 6A(1)

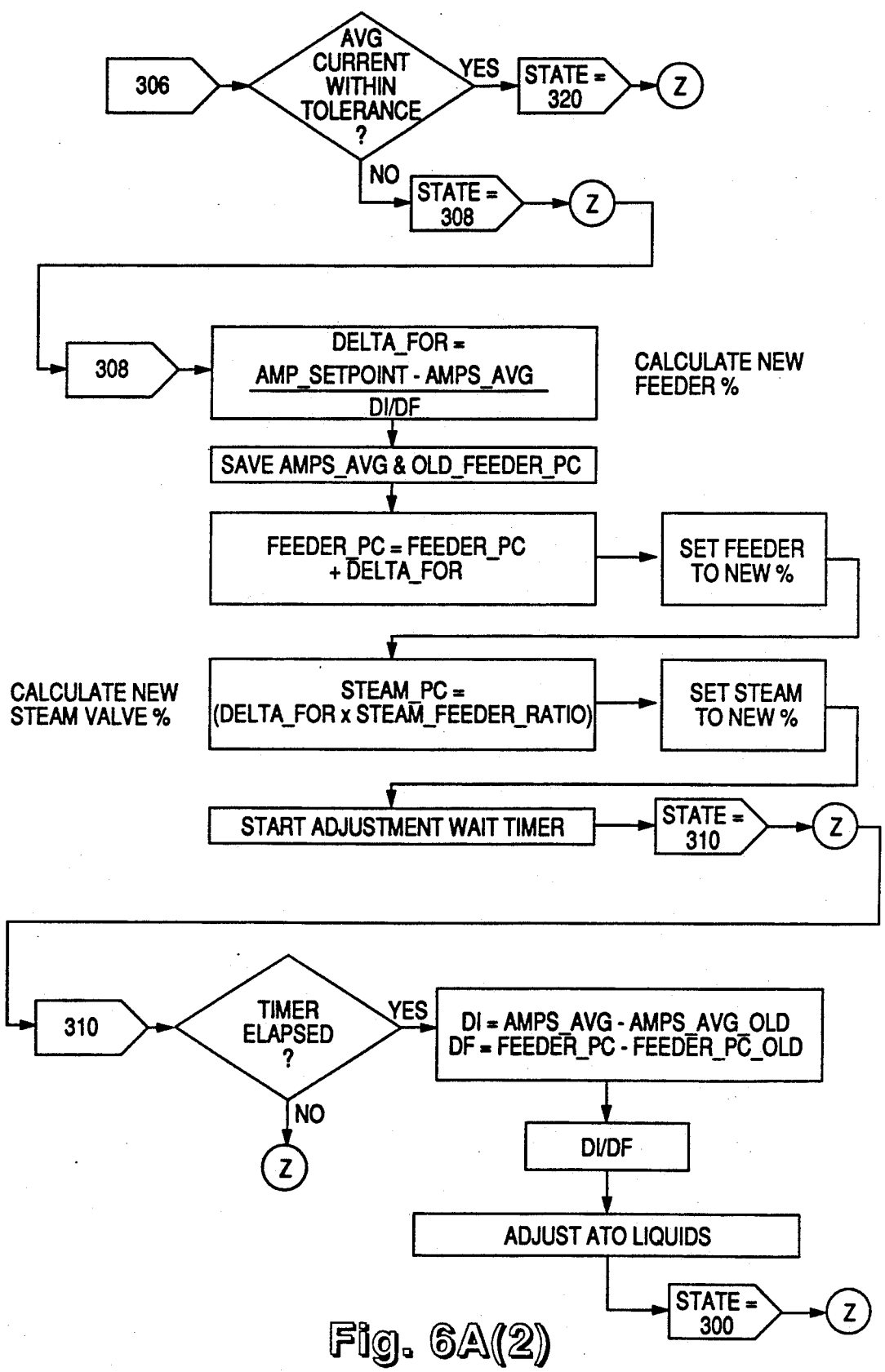
Fig. 6A(2)

SYNERGETIC AUTOMATIC CONTROL SYSTEM FOR PELLET MILL

BACKGROUND OF THE INVENTION

This invention relates to the manufacture of pellets, for example, pellets fed to pets and livestock. Typically, the equipment used to make such pellets includes a bin for containing dry pellet material, a motorized feeder, a source of moisture and heat, a motorized conditioner where the moisture is added to the pellett material, and a motorized pellet producing means. This invention relates to equipment in which moisture and heat are supplied with steam and the pellet producing means is a motorized die with holes from which the pellets are extruded.

The current load on the motor of the pellet producing means is a measure of the efficiency of the equipment. This load depends on at least two important factors. First, the load is dependent on the rate at which feed mash is fed into the pellet producing means. The faster this feed rate, the greater the load, Second, the load depends on the composition of the mash, especially its temperature and moisture content.

If these factors do not meet optimum conditions, the die motor will either be used inefficiently if the load is too small or become plugged if the load is too large. For example, up to a certain critical point, moisture, such as steam, acts as a lubricant for the dry material, thereby reducing the current load. Above a certain rate of input of dry material, however, more steam can cause the conditioned mash to thicken, causing the die to become plugged.

In addition to being important to efficiency, accurate inputs of liquids and heat are important to ensuring good quality of pellets. For example, a certain degree of heat during pelleting ensures that the pellets will be digestible.

Two limitations on the ability of reach optimum conditions for both efficiency and high quality production are: current load and heat conditions inside the pellet mill are constantly changing, and the ability to adjust the input of dry material and steam is constrained by the danger of overloading the die motor.

Various methods have been developed to control the relationship during operation of dry feed to steam and other liquid ingredients. Until the 1970's, these ingredients were controlled by operator intervention. In the past two decades however, automatic control systems have been developed for controlling them.

One such control system, disclosed in U.S. Pat. No. 3,932,736 and its improvement patent, U.S. Pat. No. 4,463,430, uses temperature or steam input as an "operating parameter". The system operator selects one of these parameters as a controlling parameter, which then automatically controls the input of ingredients.

Another automatic controls system is disclosed in U.S. Pat. No. 4,327,871. this system regulates temperature by changing the steam input. During operation, the system senses the power consumed by the die motor. After detecting when this power begins to rise as a result of increased steam input, the system then decreases the steam to a point where power consumption is again at a minimum. The same ratio of steam to feed is maintained until power consumption again begins to rise.

In neither of these patents are the inputs of dry material and steam interrelated to maintain a desired current load of the die motor and temperature in the pellet mill. The present invention uses a constant interplay of relationships of the current, temperature, feeder speed, and steam input. The system continually monitors the current and temperature. At periodic intervals, the system determines whether the current is within a tolerance of a predetermined desired value. If the current is not in tolerance, the system adjusts the feeder speed. For each change in feeder speed, the system adjusts the steam input. If the current is within tolerance, the system determines whether the temperature is within tolerance, and if not, adjusts steam input. The amount of each adjustment of feeder speed or steam input is a function of the effect of the next preceding adjustment. The effects of preceding adjustments on the current are also used to predict whether an overload condition is imminent. In this manner, the system not only achieves the optimum load conditions, but also prevents the die from becoming plugged.

OBJECTS OF THE INVENTION

One object of the invention is to operate a pellet mill with maximum efficiency. A predetermined target current load is maintained by adjusting feeder speed, such that each adjustment in feeder speed causes an adjustment in the input of steam.

Another object of the invention is to operate a pellet mill so that pellets are made at a desired temperature. A predetermined target temperature in the mill is maintained, such that once the current load is within the predetermined tolerance, the temperature in the mill is adjusted by adjusting the input of steam.

Another object of the invention is relate each adjustment in dry material input or steam input to the effect of the preceding adjustment. In this manner, the adjustments respond to constantly changing conditions in the pellet mill.

Another object of the invention is to predict when an increasing current load on the die motor makes a plug of the die imminent. The system monitors the effect of increases in dry material and steam input to determine whether the current load on the die motor is increasing in a manner that will exceed a predetermined overload current.

Another object of the invention is to avoid a plugged die by automatically diverting conditioned mash from the die when a plug condition is imminent.

DESCRIPTION OF THE DRAWINGS

FIG. 2(A) and 2(B) are a shows the front panel of the console shown in FIG. 1.

FIG. 4 is a flowchart of the Main routine of the system software used with the host computer shown in FIG. 1.

FIGS. 5(A)(1) to 5(B)(2) are a flowchart of the Startup routine of the system software used with the host computer of FIG. 1.

DETAILED DESCRIPTION

Figure 1:
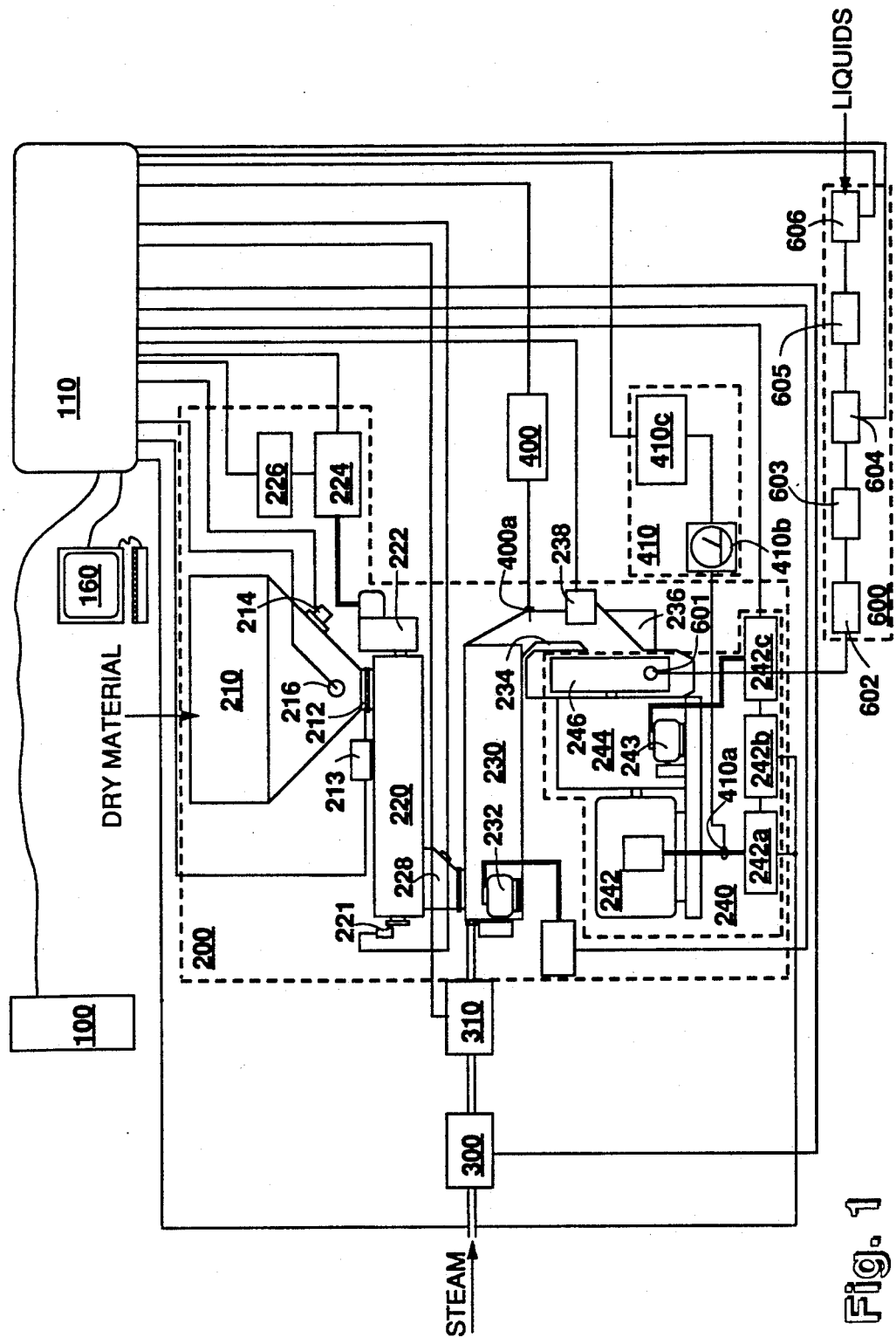
FIG. 1 shows the equipment used with the system, including a schematic of the pellet mill and block diagrams of related components.

As shown in FIG. 1, the most basic components of the system are host computer 100, console 110, pellet mill 200, steam valves 300 and 310, and sensing circuits 400 and 410. It's important to note that the system shown in FIG. 1 may be part of much larger pellet manufacturing system. For example, an auxiliary liquid input system, generally designated as 500, may be used to apply liquids after the pellets are made. Other auxiliary systems may control upstream batching of raw materials into the pellet mill, coating finished pellets, and delivery of finished pellets to storage. Such auxiliary systems, although not shown in FIG. 1, are referred to herein in general terms and are well known in the industry.

Host computer 100 performs the system's "intelligent" operations, which are discussed more fully below in connection with the system software. In the preferred embodiment, host computer 100 is a microcomputer, having a power supply, memory device, and a microprocessor, and input-output device. In the preferred embodiment, the microprocessor is an integrated circuit known as the Intel 80386.

The memory of host computer 100 is a standard electronic storage device such as a hard disk. This memory contains various information files. One such file is a Configuration file, which stores a number of parameters that limit operation of various components of pellet mill 200. These parameters, their abbreviations, and typical values are:

| | |
|---|---|
| Die Motor Overload Current = 500.0 Amps | Overload |
| Die Motor Min. Load Current = 150.0 Amps | DieMinLoad |
| Die Motor Max. Idle Current = 120.0 Amps | DieMaxIdle |
| Die Motor Min. Idle Current = 100.0 Amps | DieMinIdle |
| Conditioner Motor Max. Idle Current = 10.0 Amps | CondMaxIdle |
| Conditioner Motor Min. Idle Current = 5.0 Amps | CondMinIdle |
| Feeder Adjustment Wait Time = 30 Seconds | FdrWait |
| Steam Adjustment Wait Time = 60 Seconds | SteamWait |
| Startup Warning Horn Delay = 5 Seconds | HornDelay |
| Mash Bin Gate Open Delay = 10 Seconds | GateOpenDelay |
| Die Motor Startup Delay = 60 Seconds | DieDelay |
| Conditioner Startup Delay = 5 Seconds | CondDelay |
| Feeder Startup Delay = 5 Seconds | FdrDelay |
| Steam Turn On Delay = 5 Seconds | SteamDelay |
| Bin Vibrate Time = 5 Seconds | VibTime |
| Dump Gate Open Time = | GateTime |

-continued

| | |
|---|---|
| 3 Seconds | |
| Feeder Calibration = 1.000 Pounds/Pulse | FdrCal |
| Mash Flow Averaging Factor = 0 | FlowAvg |
| High Bin Switching Delay = 100 Seconds | HighBinDelay |

Another file in memory of host computer 100 is a Control file, which contains specific parameters for the material being pelleted. These parameters, their abbreviations, and typical values are:

| | |
|---|---|
| Die Motor Set Point Current = 380.0 Amps | DieSet Point |
| Die Motor Operating Current Tolerance = 10% | CurrentTol |
| Max. Feeder Speed Adjustment = 10.0% | MaxFdrSpd |
| Min. Feeder Speed Adjustment = 1.0% | MinFdrSpd |
| Mash Temperature Set Point = 185.0 Deg. F. | TargetTemp |
| Mash Temperature Tolerance = 10.0 Deg. F. | TempTol |
| Mash Temperature Adjustment = 4.0% Full Open | TempAdj |
| Cold Fdr. Motor Start Percentage = 15.0% | ColdFdr |
| Hot Fdr. Motor Start Percentage = 20.0% | HotFdr |
| Cold Die Steam Start Percentage = 25.0% | ColdSteam |
| Hot Die Steam Start Percentage = 38.0% | HotSteam |
| Steam-to-Feeder Adjust Constant = 0.3 | SteamFdrRatio |

The parameters specified in the Configuration and Control files are operator specified, and may be changed by the operator. Additionally, thereby may be more than one Control file, with the system being directed to a particular Control file by the operator according to the type of pellet formula being processed. In the preferred embodiment, a batching system (not shown) tags each formula so that the system will access the correct Control file. The functions of the Configuration and Control file parameters are explained below in connection with the various system programming routines that use them.

Figure 2B:
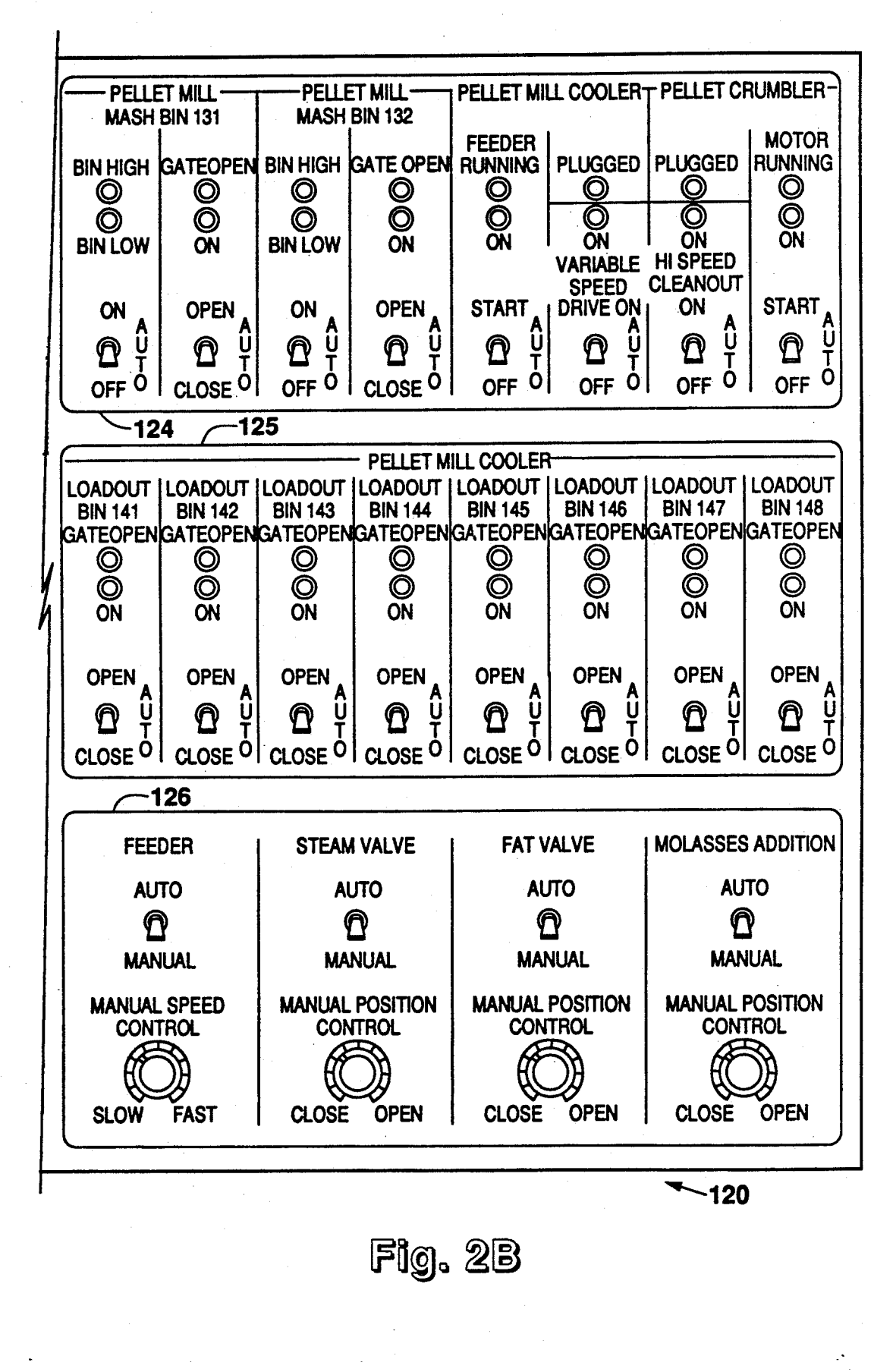

As shown in FIG. 1, console 110 is an interface between host computer 100 and pellet mill 200. Console 110 may be used with standard peripheral devices, such as video display 160, which permits communication of information from the system to the operator. The front panel of console 110 is shown in FIG. 2 and various circuit boards contained within console 110 are shown in FIG. 3.

Front panel 120 includes a number of indicator lights and control switches. Mill equipment panel 121 indicates that status of oil pump 243, die motor 242, conditioner motor 232, feeder motor 222, and bin 210. Equipment panel 121 also permits the operator to manually control using toggle switches, vibrator 214, die motor 242 and oil pump 243, conditioner motor 232, feeder motor 222, steam valve 310, deflector 236, pellet mill horn (not shown), and an override that permits the operator to control the downstream delivery system manually. A first auxiliary system panel 122 indicates the status and permits operator control of at-the-die liquid inputs, crumbling equipment, and various delivery system equipement. Molasses input panel 123 indicates the status and permits operator control of molasses, which is an optional pellet ingredient. A second auxiliary system panel 124 indicates the status and permits operator control of storage bins that contain dry material prior to being conveyed to bin 210, and cooling and crumbling equipment. Distribution system panel 125 indicates the status and permits operator control of the distribution system that determines where the pellets go after being produced. Ingredient control panel 126 permits the operator to select either automatic or manual control of input of dry material, steam, fat and molasses. If manual control is selected, the operator may control the amount of input with variable potentiometers.

Figure 3:
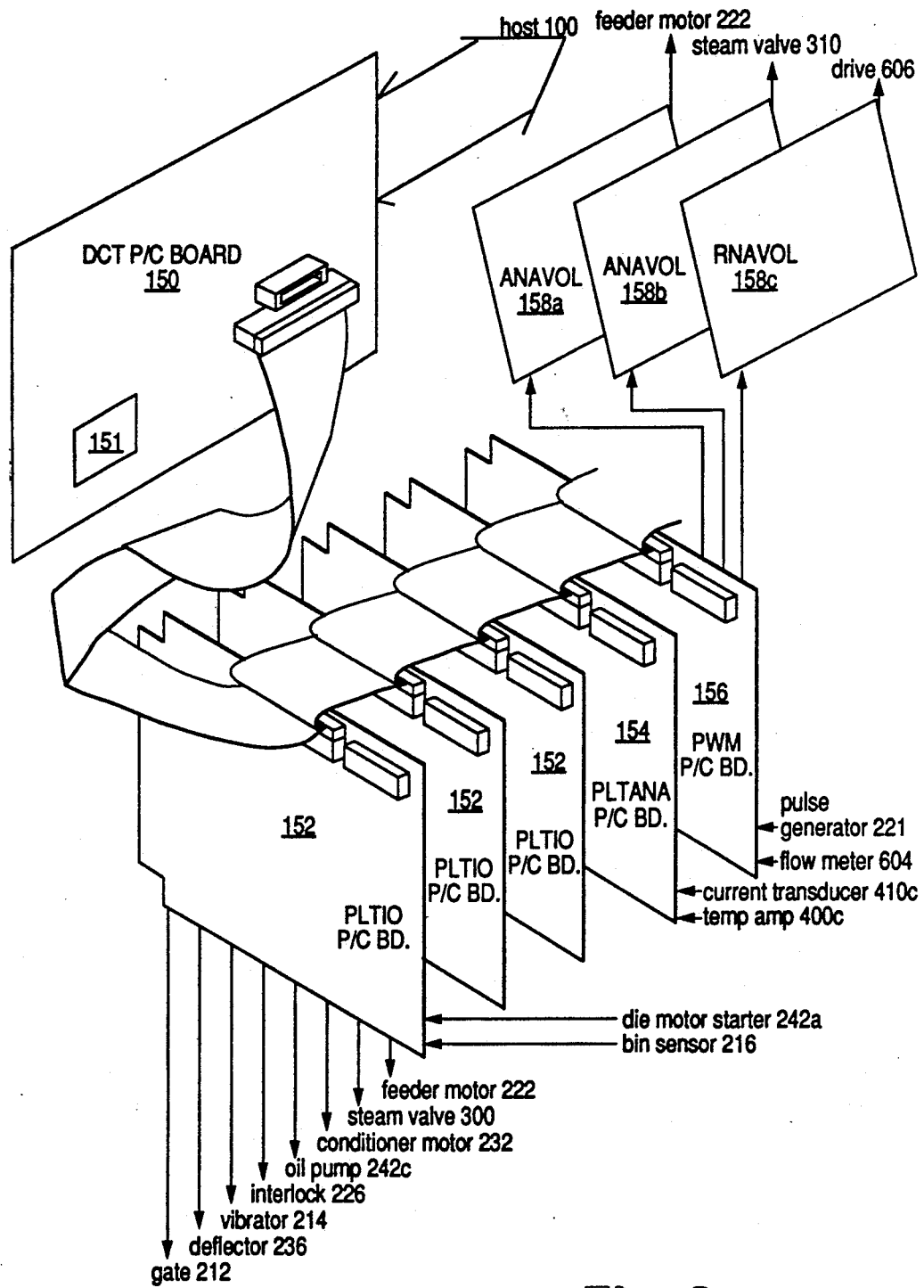
FIG. 3 is a schematic diagram of the circuit boards contained within the console shown in FIG. 1.

FIG. 3 shows the circuit boards within front panel 120. DCT board 150 is a data collection terminal board, which includes microprocessor chip 151. In the preferred embodiment, microprocessor 151 is an integrated circuit, such as standard part known as a Z80. The purpose of having a separate microprocessor in console 110, apart from the microprocessor of host computer 100, is so that certain controls can be accomplished quickly. For example, as will be explained below, when the system acts to avoid a plug, selected pellet mill devices are turned off by signals directly from console 110. Although the function of these circuit boards is explained below in connection with the system software, their physical structure and connections are briefly summarized in the next three paragraphs.

PLTIO board 152 is an input-output board that receives digital information from host computer 100, via DCT board 150, and transmits on-off to various devices of pellet mill 200. Specifically, OLTIO board 152 sends an enable signal for feeder motor 222 and controls steam valve 300, conditioner motor 232, oil pump 242c, interlock 226, vibrator 214, deflector 236, and gate 212. PLTIO board 152 also receives information signals from pellet mill 200. Specifically, PLTIO board 152 receives a signal from bin 210 of pellet mill 200, indicating whether the supply of dry material in bin 210 is low, and a signal from die motor starter 242a, indicating that die motor 242 is on.

PLTANA board 154 is an input board that receives analog input from temperature sensing circuit 400 and current 410 and converts this input to digital form. This information is communicated to host computer 100, via DCT board 150. Although not shown in the drawings, if other measurements are desired, such measurements may also be converted to digital information with PLTANA board 154.

PWM board 156 is a pulse width modulator board that receives input from pellet mill 200 that permits the rate of input of raw material into conditioner 230 and die 246 to be calculated. Another input to PWM board 156 determines the amount of liquid being input at die 246. These inputs are explained below in connection with the relevant pellet mill devices, which are pulse width modulator 221 and flow meter 604, respectively, PWM board 156 also transforms digital information from computer 100, via DCT board 150, to analog signals used to control various the supply of ingredients into pellet mill 200. For example, if digital values range from 0 to 200 and the present value is 100, PWM board 156 produces a pulse that is on for one-half of a full period.

Three additional circuit boards are interfaces between PWM board 156 and pellet mill devices that require analog input. ANAVOL board 158a receives input from PWM board 156 and sends analog signals to feeder drive 224. ANAVOL board 158b receives input from PWM board 156 and sends analog signals to steam modulator value 310. ANAVOL board 158c receives input from PWM board 156 and sends analog signals to liquid input drive 606.

Pellet mill 200 has a number of components, with the four most basic parts being bin 210, feeder 220, conditioner 230, and pellet producing means 240. Pellet mill 200 is similar to pellet mills manufactured by various manufacturers, and the parts described herein are typical of those readily available in the marker.

Bin 210 contains dry material for the pellets, which may be formulated from any of a variety of formulas. Bin 210 drops the dry material through gate 212 into feeder 220. Gate 212 is electronically controlled, so that it may be opened or closed by means of a signal from PLTIO board 152. In the preferred embodiment, gate 212 is an air gate, controlled by a solenoid 213. Attached to bin 210 is vibrator 214, which shakes bin 210 to enhance to flow of raw material to feeder 220 when the amount of dry material in bin 210 is low.

Feeder 220 is driven by a motor 222, the speed of which is controlled by a variable speed drive 224. Input from ANAVOL board 158 controls how fast motor 222 operates. feeder 220 receives dry material from bin 210 at one end, and a rotating screw (not shown) carries the dry material to the other end of feeder 220. The speed of motor 222 is continuously variable, and by changing the speed of motor 222, the supply of dry material through feeder can be varied in known and predictable quantities. In the preferred embodiment, an interlock 226 is used to protect variable speed drive 224. Interlock 226 is a standard device normally provided as a part of pellet mill 200.

The dry material in feeder 220 is carried to a channel 228 that leads into conditioner 230, which also receives steam from an external source. The steam moistens and heats the dry material to form a mash. One purpose of the moisture is so that subsequent pelleting in pellet producing means 240 will be easier because of the lubricating effect of the moisture. Moisture and heat also provides the finished pellets with a suitable consistency, binding capability, and hardness. Another purpose of the heat is digestibility in the case of animal feed.

The supply of steam is controlled by two valves, shutoff valve 300 and a modulating valve 310. During normal operation of pellet mill 200, modulating valve 310 controls the amount of steam supplied to pellet mill 200. The extent to which modulating valve 310 is open or closed is controlled by ANAVOL board 158b. The supply of steam may be completely shut off by means of shutoff valve 300, which is controlled PLTIO board 152.

Conditioner 230 is driven by a motor 232, which is controlled by PLTIO board 152. In the preferred embodiment, conditioner motor 232 runs at a constant speed. From conditioner 230, the pellet mash travels down chute 234 and into the pellet producing means 240. At the bottom of chute 234, deflector 236 may be opened or closed. When deflector 236 is closed, as shown in FIG. 1, the material from chute 234 is directed into die 246. However, with deflector opening means 238, deflector 236 can be opened so that the material from chute 234 bypasses die 246. In the preferred embodiment, deflector opening means 238 includes an air cylinder and solenoid.

Pellet producing means 240, includes, in the preferred embodiment, a motor 242, gear 244, and die 246. Motor 242, during operation of the pellet mill has an instantaneous load current, DieAmps, which is related to its power consumption. As will be discussed below in connection with the system software, DieAmps is a value that is continuous available to the system software. Motor 242 is an electric motor, which has a relatively high power consumption, typically about 300 horsepower. Motor 242 has a starter 242a, interlock 242b, and a oil pump starter 242c, which are standard parts of pellet mill 200. Oil pump 243 works with die motor 242. Interlock 242b protects the system so that die motor 242 is not started until oil pump 243 is running, and ensures safety by making sure that certain doors and gates are closed before die motor 242 is started. Inside die 246, a pressing mechanism (not shown) presses the pellet material through small radial holes in the die to form worm-like extrusions, which are cut off at appropriate lengths.

An auxiliary at-the-die liquid system 600, used with pellet mill 200, is a system for applying liquids to the extruded pellets ate die 246. A spray nozzle 601 is used to apply at-the-die, or ATD liquids, and is connected to a supply system by a hose, which leads to manifold 602, which is regulated by shutoff valve 603. A flow meter 604 deliver signals to PWEM board 156 so that the amount of ATD liquid flow can be measured and monitored by computer 100. The amount of ATD liquid input is controlled by pump 605 and variable speed drive 606. The signals to drive 606 are provided by ANAVOL board 158c. ATD liquids are applied as a percentage of the rate of pellets being extruded from die 246, with these calculations being made by computer 100.

Another auxiliary system, which not shown in FIG. 1, is a downstream delivery system that transports pellets from pellet mill 200. The delivery system is controlled by another program running on host computer 100, apart from the pellet mill control software described with the present invention. However, the software of this invention and the software controlling the delivery system can exchange information. For example, the delivery control program can inform the pellet mill control program whether it is controlling the delivery devices. The pellet mill control program can signal the delivery control program to turn off certain devices, which is referred to below as "releasing" the delivery system.

As shown in FIG. 1, various sensing and measuring devices measure conditions at pellet mill 200. Via console 110, these measurements are provided to the system software as digital information. As explained below in connection with FIGS. 4 through 12, certain variable names refer to these measurements in digital form.

One such measurement is a "low" fill condition of bin 210. In the preferred embodiment, sensor 216 includes an electrical switch that is closed when the sensor is cover with pellet material. Sensor 216 delivers a signal to PLTIO board 152, which delivers digital information to host computer 100. As explained below, a "low" condition will cause vibrator 214 to operate.

A second such measurement is the rate of dry material passing through feeder 220. This feed rate is measured by means of a pulse generator 221, which detects revolutions of the inner screw of feeder 220. In the preferred embodiment, pulse generator is attached at one end of feeder 220. A disc attached to the end of the feeder screw has a series of magnets arranged in a circle. A magnetic switch operates as each magnetic passes by during rotations of the feeder screw. By counting these rotations, which are proportional to the transported quantity of feed, the feed rate can be calculated.

A third such measurement is the temperature in conditioner 230, which is sensed by a temperature sensing circuit 400. In the preferred embodiment, sensing circuit 500 has a temperature probe 400a and an amplifier 400b. An example of a suitable temperature probe is a readily available device manufactured by Senso-Metrics, Inc., model PTA4L. Temperature probe 400a delivers a signal to amplifier 400b, which then delivers the signal to PTLANA board 154. Essentially, temperature sensing circuit 400 transforms a resistance to a voltage measurement that can be converted to digital information by PLTANA board 154.

A fourth measurement is the current load of die motor 242, which is sensed by current sensing circuit 410. Current transformer 410a, ammeter 410b, and transducer 410c measure this current and deliver a value to PLTANA board 154. Essentially, current sensing circuit 410 transforms a current measurement to a voltage measurement that can be converted to digital information by PLTANA board 154.

FIGS. 4 through 6 and 8 through 12 are flowcharts depicting the system software for host computer 100. The program has a state programming construction, which designates various routines with state identifiers and requires the program to return to a common point at designated times.

FIG. 4 is a flowchart of the main control program, Main, used with host computer 100. As indicated by the connector symbol, "Z", which also appears in FIGS. 5, 6, and 8-12, Main is called from different places f the software. For example, every time a new state is designated, Main is executed. Also, as explained below Main will execute during various wait times. Calling Main through the Z connector permits a two-second sleep time, which allows host computer 100 to attend other systems software if necessary. The Z connector also ensures that timers will be serviced and that values representing the current load and temperature in pellet mill 20 will continually be available to the system software. Additionally, the presence of conditions indicating that die 246 is likely to become plugged is continually monitored.

Thus, the first step of Main is to update all timers used with the system. These timers are explained below in connection with the various routines that use them. With input from console 110, which has converted the temperature measured by temperature sensing circuit 400 into digital form, Main obtains the mash temperature, MashTemp, at conditioner 230. Similarly, with input from console 110, which has converted the current measured by current sensing circuit 410 into digital form, Main obtains the instantaneous current of die motor 242, DieAmps. The system also obtains an average value for the current load of die motor 242, AmpsAv, which is an average over the preceding 5 seconds. The calculation of AmpsAv and the availability of AmpsAv to Main are explained below in connection with the plug detection code shown in FIG. 7. Although not shown in the drawings, additional sensing circuits may be added, such as a circuit to obtain the current load of conditioner motor 232.

Main next calculates the feed flow rate. This is determined by pulse generator 221, which has delivered its input to PWM board 156. The feed flow rate is used in connection with determining the amount of liquids to be applied by at-the-die liquid system 600.

If necessary, Main takes care of any bin switching controls that are requested by the operator. This step is used in connection with an auxiliary delivery system after the pellets are extruded from die 246. For example, after the pellets are extruded from pellet mill 200, they may be delivered to a selected bin. If the bin is full, the pellets can be redirected to a different bin.

Main then compares AmpsAv to a predetermined value indicating the minimum load for which at the die liquids should be applied. This minimum load value, MinLoad, which is a Configuration file value. If AmpsAv is less than MinLoad, Main assumes that there is no dry material loading die motor 242 and turns off value 603 controlling the flow of liquid into die 246. This step ensures that if there is no dry material in pellet mill 200, a flow of liquid, such as fat, will not cause pellet mill 200 to become clogged.

Main then determines whether a "plugged flag" is set, which indicates an imminent or existing plugged condition of pellet mill 200. The algorithm that sets the plugged flag, PlugDetect, is explained below in connection with FIG. 7. If the plugged flag is set, Main detours to the plugged routine, which is discussed below.

The output of Main is the present state of the system software. Each state is associated with a program routine and is associated with a state number, i.e., state32 N00. Depending on the present state number, Main branches to the appropriate routine.

FIGS. 5a and 5b are a flowchart for the StartUp routine, or state=200. There are two occasions when StartUp executes: when a particular batch of pellets is first begun, or a "hot" start such as when the system has shut off selected devices of pellet mill 200 to avoid a plugged condition. The basis function of StartUp is to turn on the various moving parts of pellet machine 200 in a timed sequence that allows for the time it takes for dry material to travel from bin 210, the time it takes for die motor 242 to reach a certain idle speed, and the time it takes for the temperature in conditioner 230 to rise.

StartUp 200 first clears account subtotals, which are values used in connection with inventory control. StartUp 200 then selects an address for nozzle 601 which applied at-the-die liquids. StartUp 200 may then prompt auxiliary systems, such a downstream system that coats the pellets after they are extruded from die 246. In connection with such systems, StartUp 200 sends information such as the lot number and percent of liquid to be used.

StartUp 200 also sends plug detection information to microprocessor 151, so that console 110 can control selected pellet mill devices to avoid a plug of die 246 or to keep a plug condition from worsening. The plug detection information includes a current load value of die motor 242 that signifies an imminent or existing plugged condition, a device address that indicates the status of the downstream delivery system, and the addresses of devices used with pellet mill 200 that should be turned off in case of an imminent or existing plug. These devices include feeder motor 222, conditioner motor 232, steam value 300, and shutoff valve 603, or any combination of these. These devices are referred to herein as "selected devices," and the decision which devices are shut off or turned on at various points in the pellet mill control program may vary.

The next step of StartUp 200 is to close deflector 236 if it is open. As described above, the closing of deflector 236 is accomplished by conventional electromechanical means, such as a solenoid, with input from PLTIO board 152.

StartUp 200 then sets initial conditions for selected ratios of changes in AvAmps, changes in the input of dry material, changes in the input of steam, and changes in MashTemp. As explained below, these changes and ratios are continually calculated during the Running routine. The input of dry material is calculated and adjusted in terms of a percentage of full capacity of feeder motor 222, or FeederPrecent. The input of steam is calculated and adjusted in terms of a percentage of a fully opened position of valve 310, or SteamPercent, DI represents changes in AmpsAv, DF represents changes in FeederPercent, DA represent changes in SteamPercent, and DT represents changes in MashTemp.

StartUp 200 then determines whether the downstream delivery system is running, via an exchange of information from that system. If not, StartUp sets a state that will start the delivery system before proceeding to the next state.

Once the delivery system is determined to be started, and after Main is executed, StartUp 204 turns on a warning born, begins a timer for the horn, ad executes Main. The horn prompts the operator to start die motor 242 and announces that pellet mill 200 is starting up. The horn sounds for a predetermined time period, HornDelay, which is a Configuration file value.

Once the HornDelay time has elapsed, StartUp 205 turns off the horn and opens gate 212 from feeder 210. A gate open timer is set, the next state is set, and Main is executed.

StartUp 206 determines whether gate 212 is open, and if so, the timer is killed and StartUp 206 sets the next state. If gate 212 is not opened in a certain amount of time, an error message is sent to the operator. The time period for the gate open delay is a value stored in the Configuration file as GateTime.

Once gate 212 is determined to be open, StartUp executes a number of steps that turn on various devices of pellet mill 200. Specifically, StartUp 207, 214, 218, and 230 start die motor 242, conditioner motor 232, feeder motor 222, and values 300 and 310, respectively. Each of these devices is turned on via a signal from console 110, with the nature of the signal being determined by whether an on-off or variable input is needed. For example, die motor 242 and conditioner motor 232 are turned on or off with signals from PLTIO board 152, which also delivers an enable signal to feeder motor 222. Feeder motor 222 and steam valve 310 are controlled by analog input from ANAVOL boards 158a and 158b. The starting of each of these mechanisms is timed with a delay timer, which ensures that the pellet producing means 240 and conditioner 230 are prepared to receive dry material and steam without becoming plugged.

Thus, after determining that mash gate 212 is open, StartUp 207 sends a signal, via PLTIO board 152 to start die motor 242. StartUp 207 then determines whether die motor 242 is actually running by means of a motor starter signal to PLTIO board 152. StartUp 207 sets a timer to ensure that die motor 242 is running within a certain amount of time, with the time period being DieDelay, a value stored in the Configuration file.

If die motor 242 is running, StartUp sets the next state. On the other hand, if die motor 242 is not running within the predetermined time period, a message is sent to the operator.

Once die motor 242 is determined to be running, StartUp 213 compares Die Amps to MaxIdle, a Configuration file value that has been predetermined to be the highest current load of die motor 242 operates without having dry material input. If the current is too high, StartUp 213 assumes that die motor 242 is not yet up to speed and executes Main.

If the current is not too high, StartUp 214 delivers a signal to start conditioner motor 232, sets a timer, sets the next state, and executes Main. The value for this timer is CondDelay, another Configuration file value.

StartUp 215 determines whether conditioner motor 232 begins to run within the CondDelay period. If so, StartUp 215 sets the next state and executes Main. If not, StartUp sends an error message to the operator.

StartUp 218 determines whether the start is a "hot" start. As explained below, the Plugged routine shown in FIG. 8 sets a hot start flag if pellet mill 200 is to be restarted after being stopped to avert a plug. StartUp 218 then obtains the appropriate value for the initial speed of feeder motor 222, which is in terms of a percent of maximum speed of feeder motor 222. These speeds, ColdFeeder and HotFeeder, are values stored in the Control file. StartUp 218 then delivers a signal, via PLTIO board 152, to enable feeder motor 222 and a signal, via ANAVOL board 158a, to run feeder motor 222 at the appropriate speed. StartUp 218 then starts a feeder running wait timer, which gives the system a predetermined amount of time in which to start feeder motor 222. The time period, FeederDelay is a Configuration file value.

After ensuring that feeder motor 222 is running within the prescribed time, and sending an error message to the operator if it is not, StartUp 223 begins a steam delay timer. This delay time, SteamDelay, is a Configuration file value. The purpose of this delay time is to make sure there is pellet material in conditioner 230 before steam is introduced into it. StartUp 223 then sets the next state and executes Main.

StartUp 225 then determines whether DieAmps, which it has obtained from Main, is greater than MaxIdle. If so, StartUp assumes the die motor 242 is receiving conditioned mash.

After DieAmps exceeds MaxIdle or after the timer has elapsed, StartUp 230 obtains a value for the initial amount of SteamPercent to be input to conditioner 230 via steam valve 310. This value is one of two values depending on whether the start is hot or cold. These initial values, ColdSteam and HotSteam, are Control file values. StartUp 230 then sends a signal to valve 310, via ANAVOL board 258b, to cause it to open to the proper position and sets a steam feeder wait timer. The wait time, FdrWait, is a Configuration file value. StartUp 230 then sets a new state.

During the FdrWait time period, StartUp 232 makes sure that conditions are satisfactory to continue operating pellet mill 200. If FdrWait elapses before such conditions occur, StartUp turns off feeder motor 222 and conditioner motor 232 and sets state=900 to a routine that requests action from the operator, OprRqst. OprRqst is described below in connection with FIG. 12.

To determine whether conditions are satisfactory to continue operations, StartUp 232 determines whether DieAmps is less than MinLoad. If DieAmps is less than MinLoad, StartUp 232 assumes that there is not enough feed entering die 246 to apply at-the-die liquids and executes Main. On the other hand, if DieAmps is greater than MinLoad, since DieAmps has already been determined to be greater than MaxIdle, StartUp 232 assumes that conditions are satisfactory for the Running routine. In this latter situation, StartUp delivers a signal to open valve 603 for ATD liquids, sets the next state, and executes Main.

StartUp 235 determines whether FdrWait has elapsed. If not, StartUp 235 executes Main. If so, StartUp 235 assumes that conditions are satisfactory for continuing the run and sets state=300, which will call the Running routine.

Figure 6B:
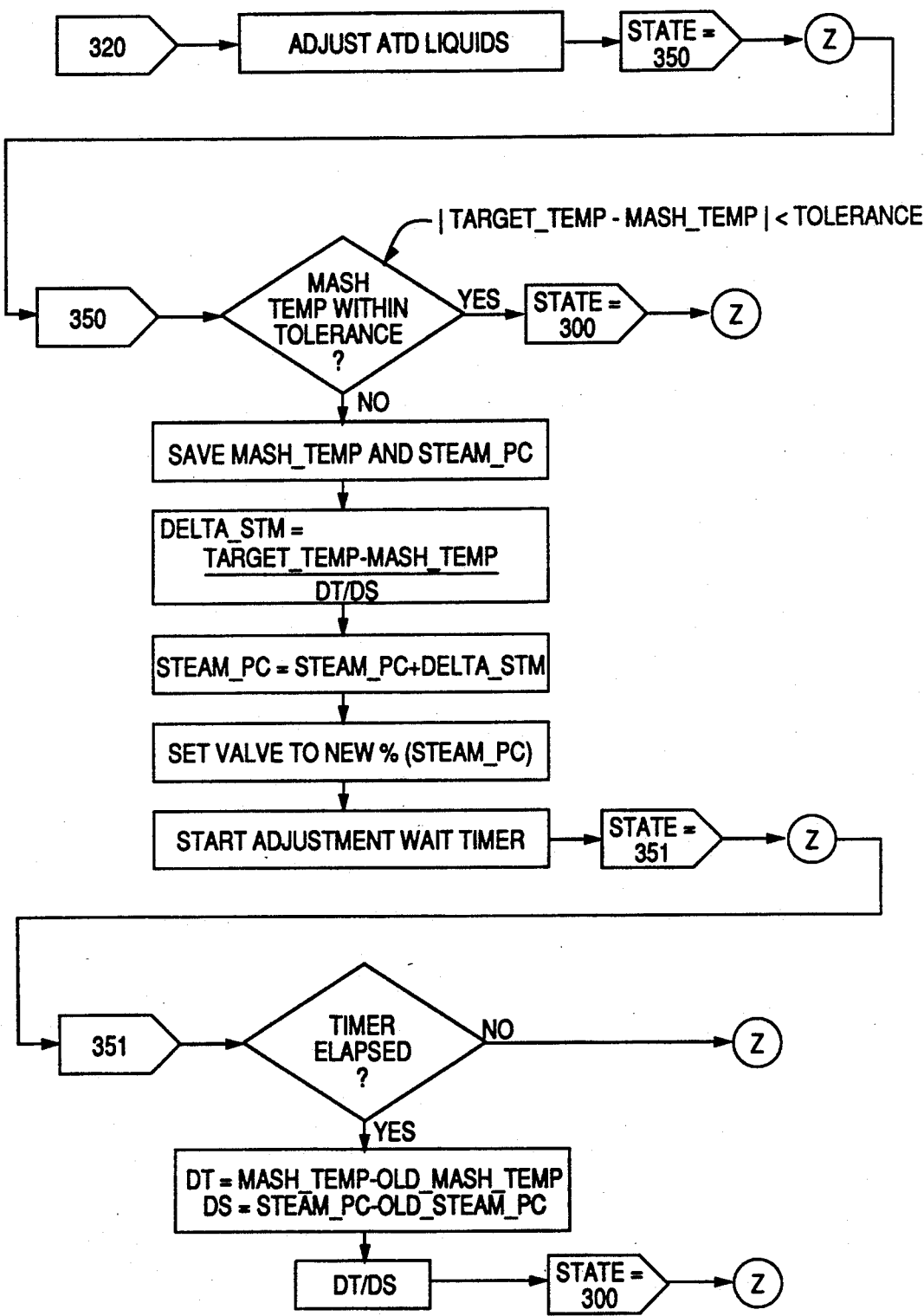
FIGS. 6 (A)(1) to 6(B) are a flowchart of the Running routine of the system software used with the host computer of FIG. 1.

FIGS. 6a and 6b are a flowchart of the Running routine, or state=300. The basic function of Running is to control input of dry material and steam in two phases. The first phase adjusts dry feed input in relation to current load and steam input in relation to dry feed input; and the second phase adjusts steam input in relation to temperature. The phases are loops that execute continuously, such that the current-feed control phase keeps the current load of motor 242 within a certain tolerance, and when this current is satisfactory, the temperature-steam control phase keeps the temperature within a certain tolerance. The devices that are controlled are feeder motor 222 and steam valve 310. These controls are calculated as percentages of maximum speed of feeder motor 222 and a fully opened position of valve 310, and are thus referred to as FeederPercent and SteamPercent, respectively.

As shown at the top of FIG. 6a, before execution of any part of Running, a short preliminary routine checks for certain conditions. Specifically, the routine checks for an error in the delivery system downstream of pellet mill 200, and if there is such an error, calls a routine DlyError, which is described in connection with FIG. 12. Running's preliminary routine also determines whether DieAmps is less than MaxIdle. If DieAmps is less than MaxIdle, which indicates that there is no dry material in pellet producing means 240, Running turns off vibrator 214 if it is on and calls OprRqst. If DieAmps is equal to or greater than MaxIdle, Running's preliminary routine returns to the appropriate Running state.

Running 300 checks the level of dry material in bin 210, using sensor 216. If the level is "low", Running 300 delivers a signal via PLTIO board 152 to start vibrator 214. A timer is set, so that vibrator 214 operates of a predetermined length of time, VibTime, a value stored in the Configuration file.

To execute Running's current-feed control phase, if bin 210 is not low or after vibrator 214 has operated, Running 306 determines whether AmpsAv is within CurrentTol, a value stored in the Configuration file. As explained above, AmpsAv is made available by Main. CurrentTol designates how close to a desire value for the current load on die motor 242 is expected to operate. Both CurrentTol and the desired value, DieSetPoint, are values stored in the Control file.

If AmpsAv is not within CurrentTol, Running 308 makes certain adjustment to the dry material and steam input. These adjustments include calculating new values for FeederPercent and SteamPercent, which were initialized by computer 100 during StartUp. Specifically, Running 308 first calculates a value for DeltaFeeder according to the following formula:

$$\text{DeltaFeeder} = \frac{\text{DieSetPoint} - \text{AmpsAv}}{\text{DI/DF}}$$

DI/DF was initialized by StartUp, but as explained below, Running 310 causes its value to continually change. The new FeederPercent is calculated from the following formula:

*FeederPercent = FeederPercent + DeltaFeeder*

Running 308 then sends a signal to feeder motor 222 via console 110 that adjusts its speed according to the new value of FeederPercent. In this manner, the amount of pellet material that enters pellet producing means 240 is adjusted as a function of the current load on die motor 242.

After adjusting the feeder speed, Running 308 calculates a new value for SteamPercent according to the following formula:

*SteamPercent = (DeltaFeeder\*SteamFeederRatio) + Steam PercentOld*

Steam FeederRatio is a value stored in the Control file of computer 100, which is a ratio of SteamPercent to Feeder Percent. SteamFeederRatio is a value of how much to open steam valve 310 in proportion to how much the speed of feeder motor 222 has been changed. This allows Running to increase the amount of steam to provide a relatively constant and desired amount of lubrication due to the increased amount of feed. Running 308 then sends a signal to valve 310, via console 110, that adjusts how open valve 310 is. In this manner, the supply of steam is adjusted as a function of both the dry material input and the current load on die motor 242.

The next step of Running 308 is to set a feeder adjustment wait timer, FdrWait, whose value is stored in the Configuration file. This timer compensates for the time lag between when adjustments are made to the input of dry material from feeder 220 and steam valve 310 and when those adjustments affect the load on die motor 242. Running 308 then sets the next state and executes Main.

After the FdrWait time elapses, Running 310 calculates new values for DI and DF according to the following formulas:

*DI = AmpsAvg − AmpsAvgOld*

*DF = FeederPercent − FeederPercentOld*

A new DI/DF ratio is then calculated for use by the next loop of Running 308. Because there is now a new rate of pellets being extruded from die 246, the ATD liquids are adjusted. Running 310 then returns to Running 300.

Referring back to Running 306, if AmpsAv is within CurrentTol, Running 306 sets state=320 and does not execute Running 308 and 310. Running 320 adjusts ATD liquids and sets state=350.

Running 350 is the temperature-stem control phase of Running. Running 350 determines whether the difference between the temperature at conditioner 230, MashTemp, and the desired temperature, TargetTemp, is within tolerance. As explained above, MashTemp is made available by Main. Both TargetTemp and the tolerance, TempTol, are values stored in the Control file. If MashTemp is within tolerance, Running 350 returns to Running 300.

If MashTemp is not within tolerance, Running 350 calculates DeltaSteam according to the following formula:

$$\text{DeltaSteam} = \frac{\text{TargetTemp} - \text{MashTemp}}{\text{DT/DS}}$$

DT/DS was initialized by StartUp, but as explained below, Running 351 causes its value to change continually. Running 350 then calculates a new value for Steam Percent according to the following formula:

*SteamPercent = SteamPercent + DeltaSteam*

Running 350 then sends a signal to steam valve 310 via console 110 that adjusts valve 310 so that the supply of steam to conditioner 230 is adjusted. Running 350 also sets an adjustment wait timer to a value, SteamWait, stored in the Configuration file. This wait period permits the effects of the steam adjustment to be realized within the pellet mill 200 before the next loop of Running determines whether there is a need for new adjustments.

After the SteamWait time has elapsed, Running 351 recalculates DT/DS as follows:

*DT = MashTemp − OldMashTemp*

*DS = SteamPercent − OldSteamPercent* running 351 then returns to Running 300.

An important feature of Running, and of the system as a whole, is the effect that each last adjustment has on the succeeding adjustment. This is a result of the use of DI/DF, DT/DS, DeltaFeeder, and DeltaSteam. DI/DF is a ratio of how much the current increased for each percent increase in the speed of feeder motor 222. Similarly, DT/DS is a ratio of how much the temperature increased for each percent increase in the closed to open position of valve 310. The use of DeltaFeeder and DeltaSteam permit the system to adjust feeder motor 222 and steam valve 310 by the amount necessary to reach the TargetCurrent and TargetTemp in accordance with the effect of the last adjustment. For example, when adjusting temperature, if TargetTemp=200 and MashTemp=100, the desired increase is 100 degrees. The system already has a value for DT/DS, for example, 4 degrees, which indicates that the preceding adjustment resulted in a 4 degree increase in temperature for each percent increase in the open position of valve 310. The necessary increase for the next adjustment, which is 100 degrees, is divided by 4. The result is 25, or DeltaSteam, which tells the system that according to conditions in the mill during the previous adjustment, a 25% change in the position of valve 310 will cause a 100-degree change in temperature. This calculation of DeltaSteam and enables the system to continually compensate for changing conditions in the pellet mill 200 so that the system can accurately predict what the next adjustment should be. Similar computations enable the system to predict the effect of adjustments to the feeder speed by determining the effect of each previous adjustment.

Figure 7:
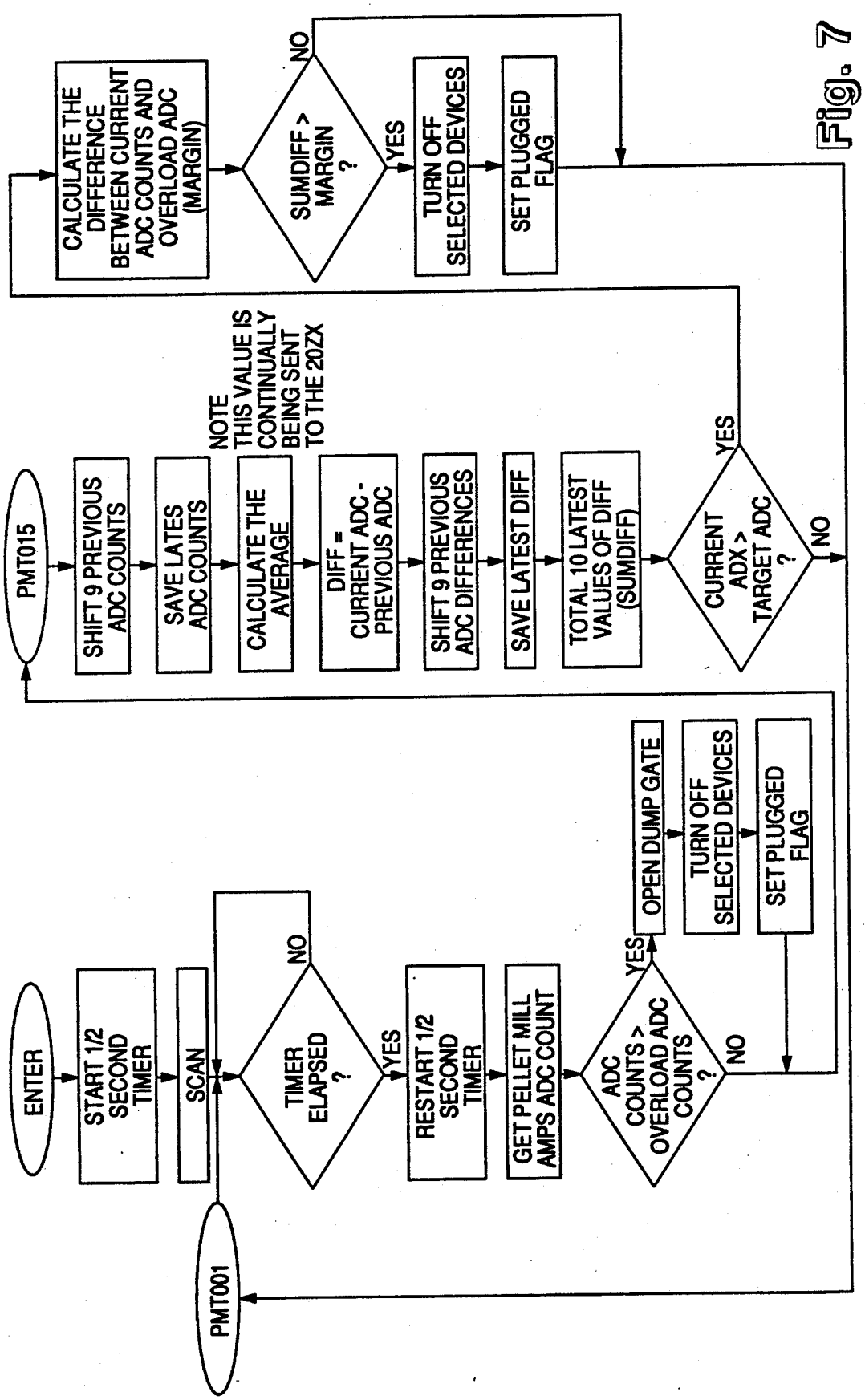
FIG. 7 is a flowchart of a plug detection code used to program the console shown in FIG. 1.

FIG. 7 is a flowchart illustrating how the system monitors the current load of die motor 242 and detects conditions that might cause die 246 to become plugged.

The programming shown in FIG. 7 is executed by microprocessor 151 in console 110, and is referred to as PlugDetect. PlugDetect executes continuously so that it can continue to monitor the current load of die motor 242 and calculate an average for return to host computer 100.

The availability of information from PlugDetect to host computer 100 is accomplished by the use of the state structure and the continuous returning at various points in all routines of computer 100 to Main. During Main, the system obtains a value for the current average and detects a plugged flag if it has been set by PlugDetect.

PlugDetect is run by console 110 rather than computer 100 because of the need for immediate control if the system detects a potential plug. Thus as explained below, PlugDetect is capable of controlling the operating devices of pellet mill 200, regardless of the state of the software execution in computer 100. Thus, if a plug condition is anticipated by PlugDetect, console 110 reacts independently of commands from computer 100. Selected devices, such as feeder motor 222, steam valve 300, and conditioner motor 232 is shut off via PLTIO board 152. Die motor 242 continues to run to clear conditioned mash from pellet producing means 240.

At the beginning of its execution, PlugDetect starts a timer, which in the preferred embodiment causes a current reading of die motor 242 to occur every ½ second. For each ½ second interval, PlugDetect then gets a value for the analog to digital conversion count of the current load of die motor 242. This value, ADC counts, is received from PLTANA board 154 in console 110 and represents a digital value that is proportional to an instantaneous reading of the current load of die motor 242. The next step of PlugDetect is to determine whether the present value of ADC counts is greater than the ADC counts representing an overload condition of die motor 242. The overload value from which the overload counts are computed is Overload, a value stored in the Configuration file. If an overload condition exists, PlugDetect opens deflector 236 via a signal from PLTIO board 152 and delivers appropriate signals to turn off selected devices. PlugDetect also sets a plugged flag, which is transmitted to host computer 100 for use by the system software used by that computer, and continues to execute.

If no overload condition exists, PlugDetect calculates an average of present ADC counts for ten readings, which is the same as an average over five seconds. This value is sent to computer 100 continuously and is used as AmpsAv in several routines of the system. To predict overload conditions, PlugDetect, sums differences between the present and last ADC counts of each instantaneous current reading for ten readings, or SumDiff. This permits the system to determine how quickly the current is increasing or decreasing over a five second period. PlugDetect then determines whether the present value of ADC counts is greater than the target ADC counts for the current. This target ADC value is computed from the CurSetPoint, a value stored in computer 100. If ADC counts is equal to or less than the target current, PlugDetect returns to the beginning of its execution.

If the present ADC value is more than the target ADC value, PlugDetect calculates Margin, which is the difference between the present ADC value and the overload ADC counts. PlugDetect then determines whether SumDiff is greater than Margin. Then, if SumDiff is equal to or less than Margin, PlugDetect returns to the beginning of its execution. If SumDiff is greater than Margin, PlugDetect assumes that, based on the existing rate of increase of current load during the past five seconds, Margin will be exceeded within five seconds and a plugged condition is likely to soon occur. Selected devices are turned off and the plugged flag is set.

The preceding paragraphs describe one embodiment of the invention wherein the power in pellet mill 200 is measured by measuring the current load on die motor 242. This embodiment is based on an assumption that the voltage to die motor 242 and its power factor remain relatively constant. Other means for measuring power could be used, such as a wattmeter. Increments of change detected by the wattmeter and processed by computer 100 would then be used in the same manner, throughout the system programming, as increments of change in current in the above-described embodiment. Still other power measurements could include measuring motor torque and revolutions to obtain delivered horsepower.

Figure 8:
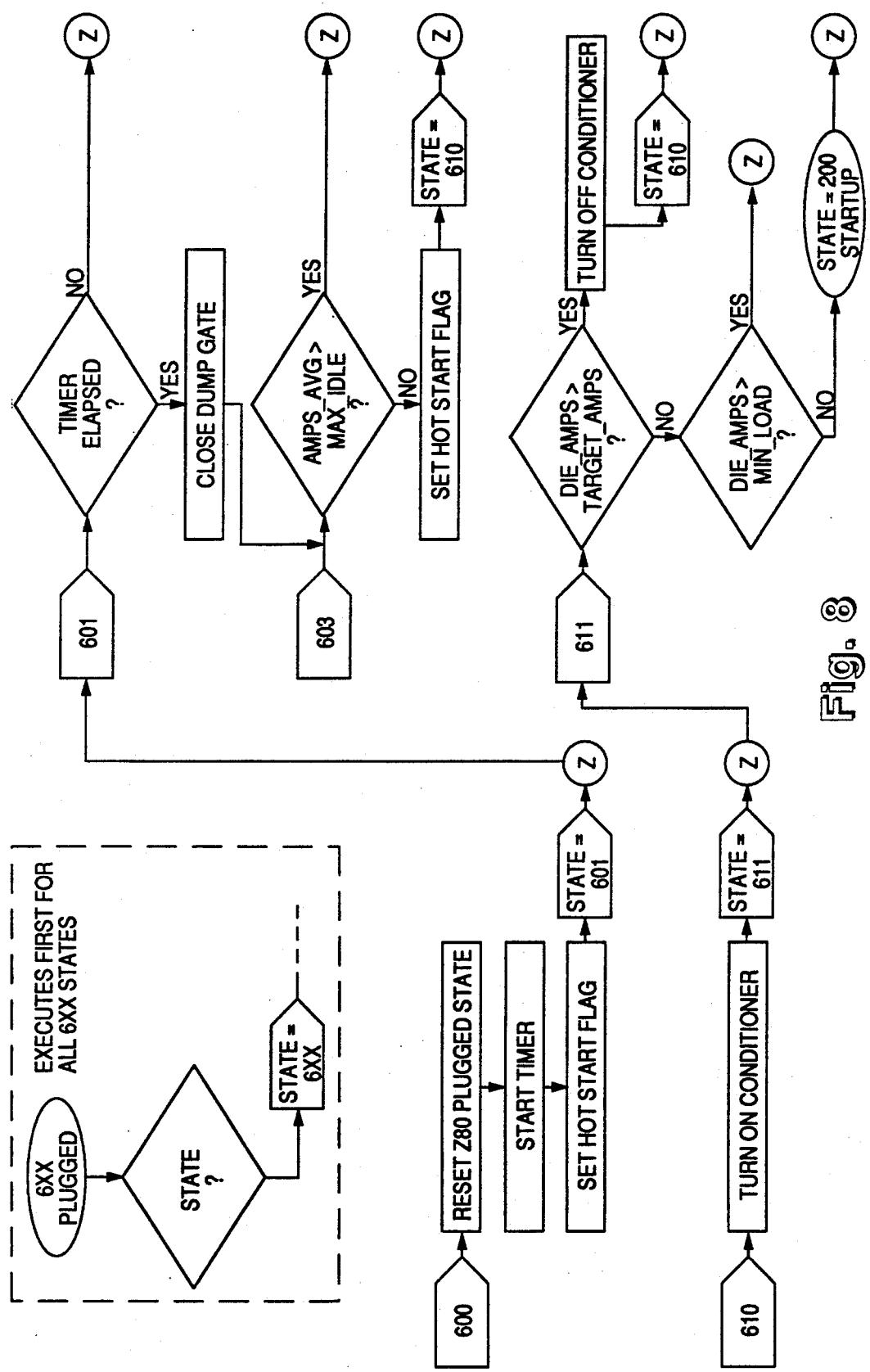
FIG. 8 is a flowchart of the Plugged routine of the system software used with the host computer of FIG. 1.

FIG. 8 is a flowchart of the Plugged routine. Plugged is called by the existence of a plugged flag, which is set by PlugDetect. As discussed above, is Main detects a plugged flag, it changes the state so that Plugged is called. The basic function of Plugged is to prepare pellet mill 200 to be restarted. The first step of every part of Plugged is state checking routine, which determines which part of Plugged is to execute next.

Plugged 600 resets the plugged flag and starts a timer. The purpose of the timer is to set a predetermined time for the open position of deflector 236, which was opened during the PlugDetect. This time period, GateTime, is a Configuration file value. The purpose of the GateTime period, is to allow chute 234 to be emptied of conditioned mash. Plugged 600 then sets a hot start flag, which as explained above in connection with Startup, is used during StartUp so that the system returns to maximum efficiency quickly. Plugged 600 then sets the next state and executes Main.

Plugged 601 determines whether the GateTime period has elapsed. If not, Plugged executes Main. If so, Plugged sends a signal, via PLTIO board 152, to close deflector 236. Plugged 603 then determines whether AmpsAv, which is available from Main, is greater than MaxIdle. If so, Plugged 603 anticipates that there may still be too much feed in die 246, so it executes Main. If AmpsAv is less than MaxIdle, the systems assumes that die motor 242 is now relieved of any load as a result of conditioned mash in pellet mill 200, and that conditions are satisfactory for a hot startup. Accordingly, Plugged sets a hot start flag, sets the next state, and executes Main.

Plugged 610 turns on conditioner motor 232, sets the next state, and executes Main. The reason for turning on conditioner motor 232 at this point is that conditioner 230 has been previously turned off by PlugDetect to avoid plugging die 246, but still contains pellet mash. Plugged 611 determines whether DieAmps, which is obtained from Main, is greater than a predetermined desired running value for die motor 242. This predetermined value, TargetAmps, is a Control file value. If DieAmps is greater than TargetAmps, the system assumes that the load on die motor 242 is too great, and delivers a signal to turn off conditioner motor 232, and returns to Plugged 610. In this manner, Plugged 610 and Plugged 611 alternate if necessary to clear out conditioner 230 so that pellet mill 200 can be restarted without plugging die 246.

If conditioner motor 232 has been turned on and DieAmps is equal to or less than TargetAmps, Plugged 611 determines whether DieAmps is greater than MinLoad. If DieAmps is greater than MinLoad, Plugged 611 assumes that for some reason, there is a disproportionate amount of feed in die 246 and executes Main. If DieAmps is less than MinLoad, Plugged 611 assumes that conditions are satisfactory to resume operation of pellet mill 200. Plugged 611 then sets state=200 and executes Main so that StartUp will be executed.

Figure 9:
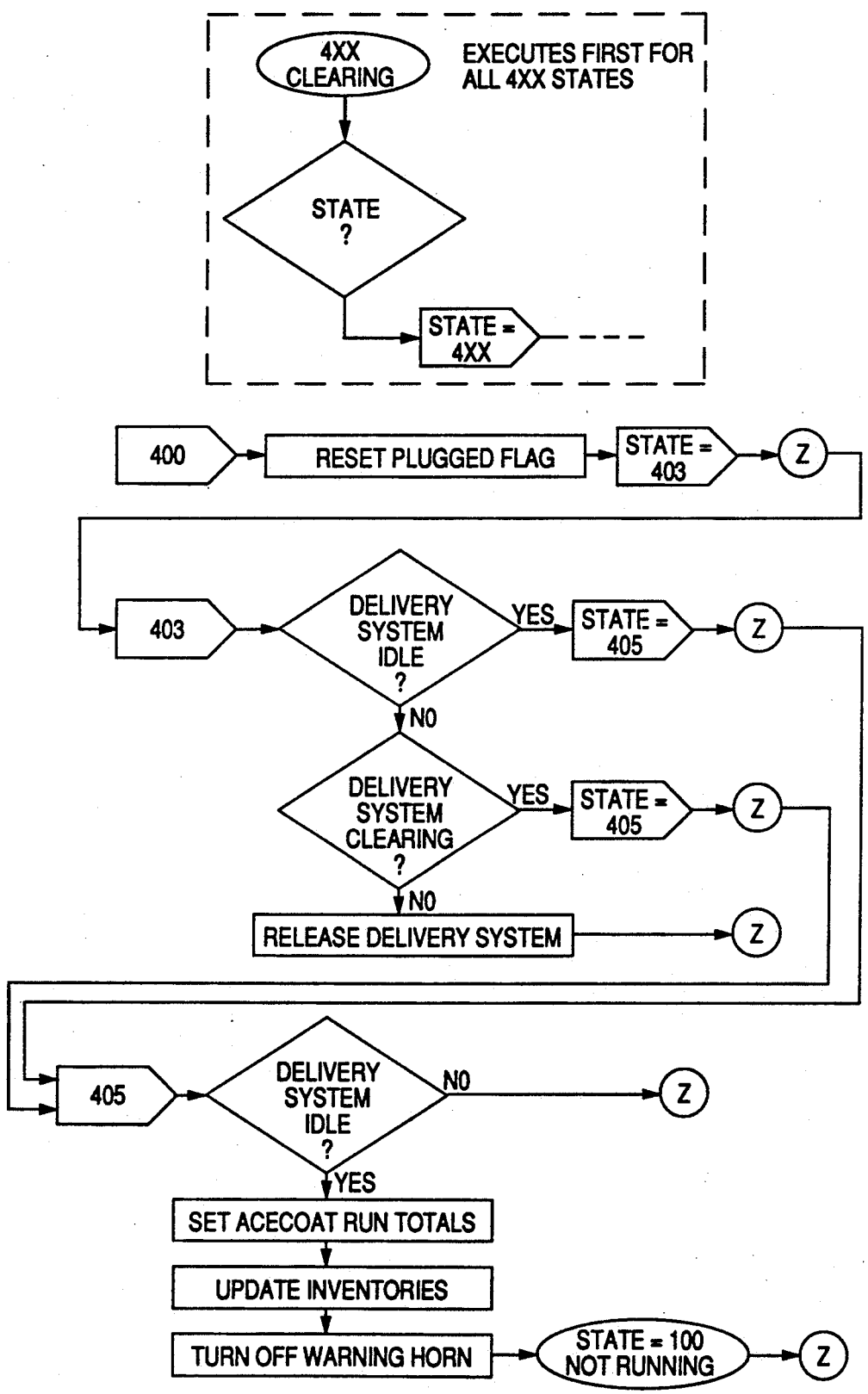
FIG. 9 is a flowchart of the Clearing routine of the system software used with the host computer of FIG. 1.

FIG. 9 is a flowchart of the Clearing routine, which executes after a run of pellets. The basic function of Clearing is to ensure that pellet mill 200 is cleared of pellet material and that the finished pellets are being handled by the delivery system. After a preliminary state checking routine, Clearing resets the plugged flag, sets the next state, and executes Main.

Clearing 403 checks to determine whether the delivery system is idle by obtaining information from the delivery system. If so, Clearing 403 calls Clearing 405 and executes Main. If not, Clearing 403 checks to see whether the delivery system is clearing. If the delivery system is clearing, Clearing 403 calls Clearing 405. If the delivery system is not clearing, Clearing 403 releases the delivery system, sets the next state, and executes Main.

Clearing 405 rechecks to see if the delivery system is idle. Clearing 405 may then be used to store various information about the run, such as for inventory control. A warning horn is turned off if it is on, and the system enters the off state, or state=100.

Figure 10:
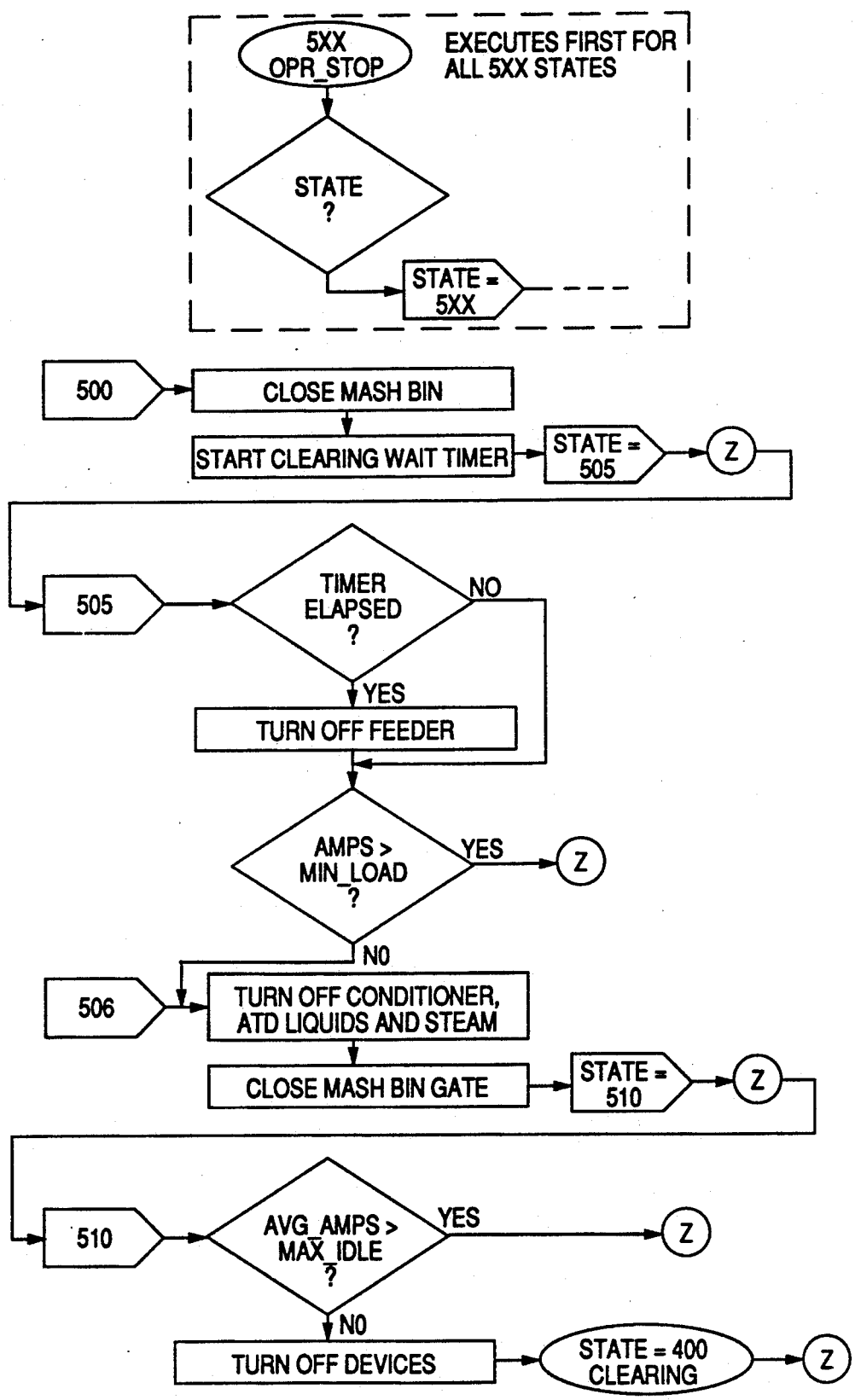
FIG. 10 is a flowchart of the OptrStop routine of the system software used with the host computer of FIG. 1.
Figure 11:
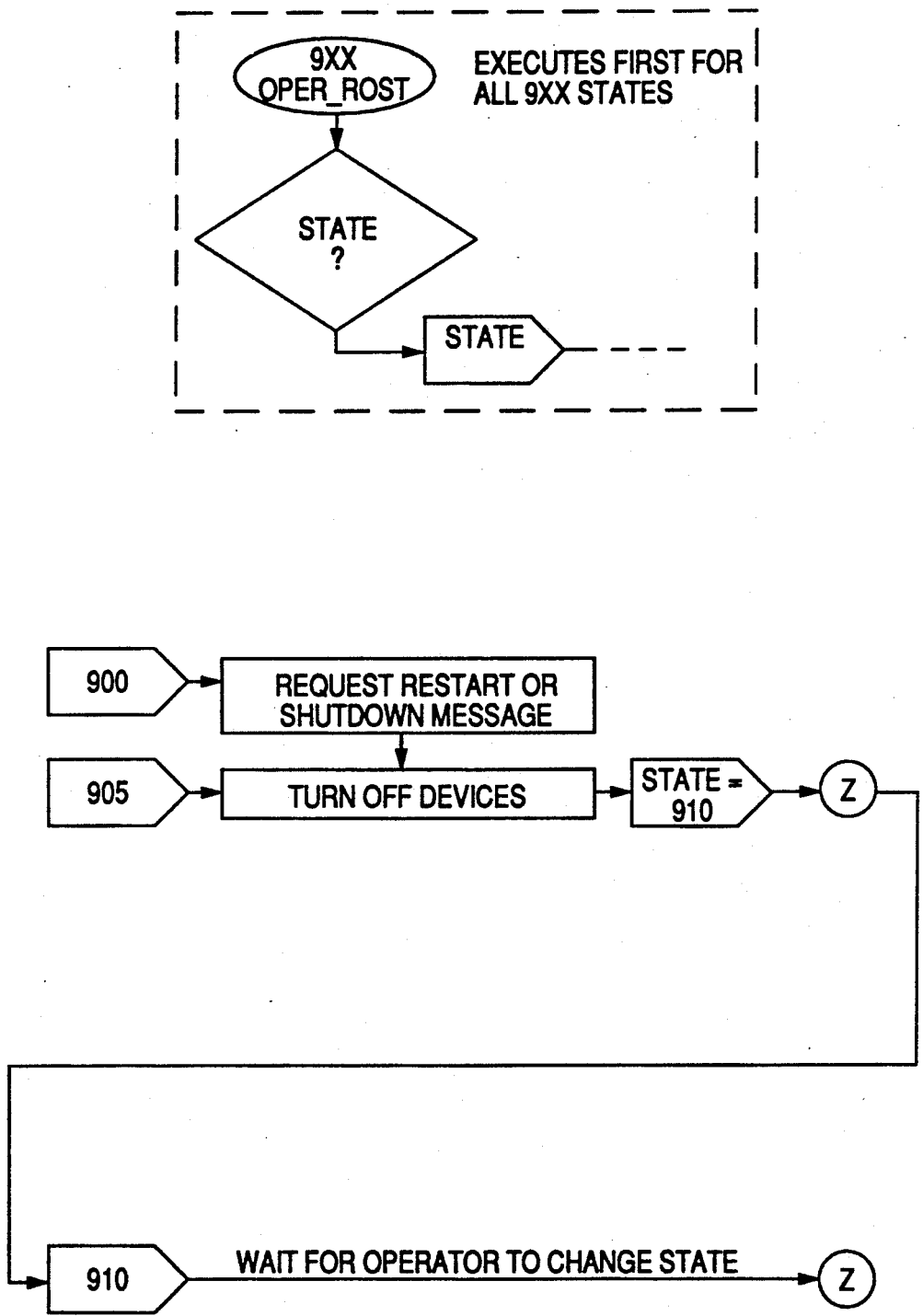
FIG. 11 is a flowchart of the OprRqst routine of the system software used with the host computer of FIG. 1.

FIG. 10 is a flowchart of the OprStop routine. The basic purpose of OprStop is to control the system if the operator enters a stop command at console 110. The first step of all routines within OprStop is a state checking routine.

OprStop 500 delivers a signal to close mash bin gate 212 and starts a clearing wait timer. This timer permits pellet mill 200 to clear itself of pellet material before shutting down. The value of the time period, FdrWait, is a Configuration file value. OprStop 500 then sets the next state and executes Main.

OprStop 505 determines whether the FdrWait time period has elapsed. If so, OprStop turns off feeder motor 222 via a signal from ANAVOL board 158. If the FdrWait time period has not elapsed, or if the time period has elapsed and feeder motor 222 has been shut off, OprStop determines whether DieAmps is greater than MinLoad. If so, OprStop assumes that there is material in pellet mill 200 still to be processed and executes Main. If DieAmps is less than MinLoad, OprStop sets the next state.

OprStop 506 turns off conditioner motor 232, steam valve 300, and the input of at-the-die liquids from nozzle 601. OprStop 506 then closes bin gate 212, sets the next state, and executes Main.

OprStop 510 determines whether die motor 242 is idle or loaded by comparing AmpsAv to MaxIdle. If AmpsAv is greater than MaxIdle, OprStop 510 assumes that there is material in pellet producing means 240 and executes Main. If AmpsAv is less than MaxIdle, OprStop 510 assumes the pellet mill is cleared, turns off selected devices, sets state=400, and executes Main so that the Clearing routine will be called.

Figure 12:
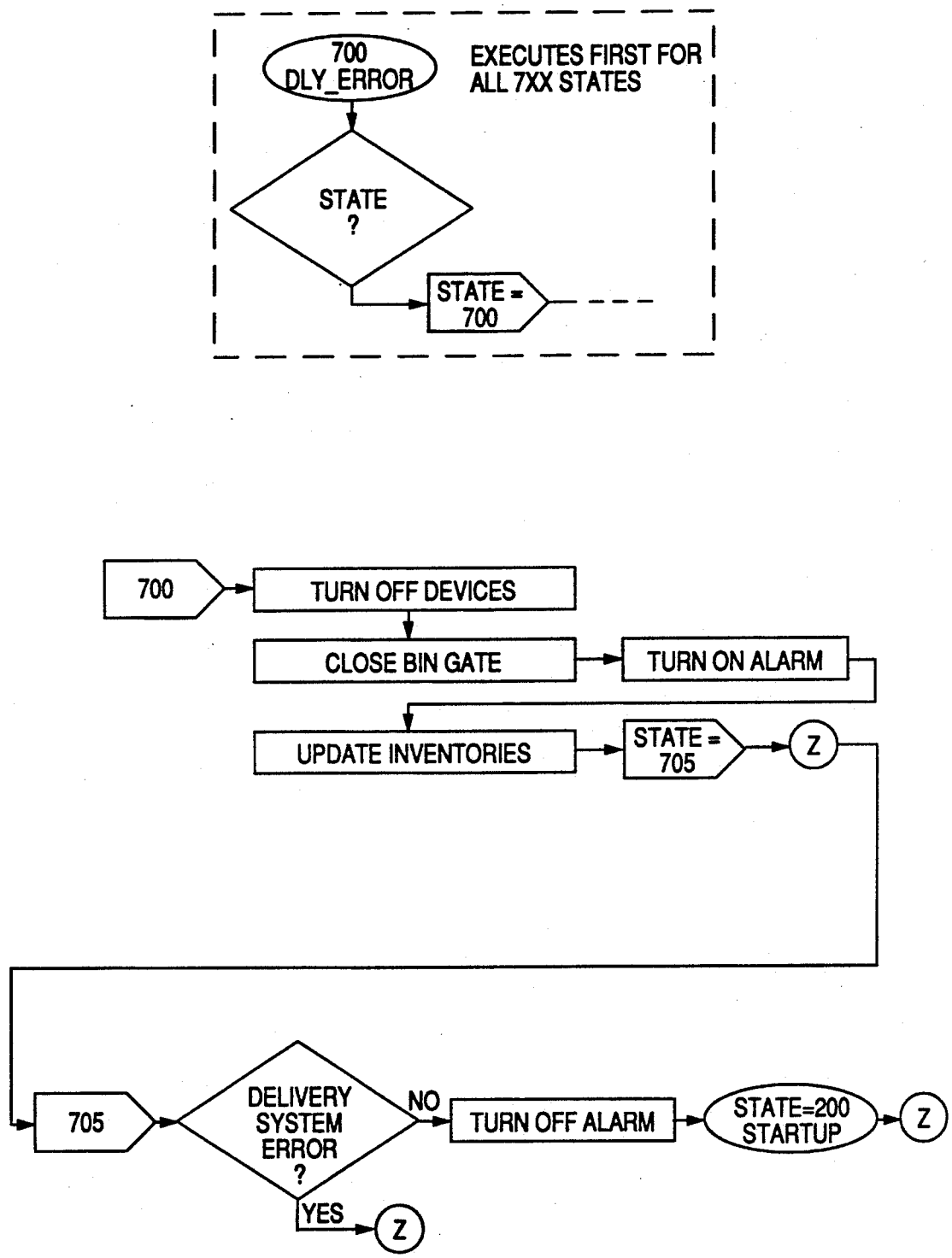
FIG. 12 is a flowchart of the DlyError routine of the system software used with the host computer of FIG. 1.

FIG. 12 is a flowchart of the OprRqst routine. The basic purpose of OprRqst is to control the system when input is needed from the operator. An example of such a situation is if bin 210 is empty, such as shown in FIG. 6a where Running set state=900. A state checking routine executes first for all routines within OprRqst.

OprRqst 900 sends a request message to the operator via console 110 and display 160. OprRqst 900 then turns off selected devices that might not have already been turned off, sets state=910, and executes Main.

OprRqst 910 waits for input by the operator from console 110, which will change the state of the system. The operator thus determines what action the system will take next.

FIG. 12 is a flowchart for the routine DlyError, or state=700. The main function of DlyError is control the system when there is a condition in the auxiliary delivery system, such as a conveyor failure. The first step of all routines within DlyError is a state check.

DlyError 700 turns off selected devices, closes deflector 236, turns on an alarm, and updates inventories. It then sets the next state and executes Main.

DlyError 705 determines whether the error condition still exists via information from the delivery system. If not, DlyError 705 turns off the alarm, sets the state to StartUp, and executes Main. If there is still a delivery system error, DlyError 705 executes Main.

The above completes the description of the preferred embodiment of Applicant's pellet mill control system. This system and all others that are obvious variations and equivalents of it are intended to be within the scope of this application. Although the invention has been described with reference to specific embodiments, this description is not meant to be construed in a limiting sense. Various modifications of the disclosed embodiment, as well as alternative embodiments of the invention, may become apparent to persons skilled in the art who read the description of the invention. It is therefore contemplated that the appended claims will cover such modifications that fall within the true scope of the invention.

We claim:

1. An automatic control system for improving the run time efficiency of a pellet mill that has a means for moistening dry pellet material with moisture in the form of steam and a means for producing pellets composed of dry material and moisture, comprising:

means for measuring the temperature in said pellet mill;

means for measuring the power used by said pellet producing means;

calculating means for repeatedly receiving temperature values from said temperature measuring means and power values from said power measuring means, and for calculating a current dry material input value and a current steam input value, said calculating means deriving said input values from stored data representing the effects of past adjustments to said dry material input and said steam input on said temperature value and said power value;

data storage means for storing past values of said power, said dry material input, and said steam input, for use by said calculating means;

interface means for converting the output of said means for measuring temperature and the output of said means for measuring power into digital signals, and for converting the output of said calculating means into adjustment signals; and means for adjusting said moistening means and said pellet producing means based on said adjustment signals.

2. The system claimed in claim 1 wherein said power measuring means measures power by measuring the current load of said pellet producing means.

3. The system claimed in claim 1 wherein said calculating means calculates said dry material input value in response to a predetermined target power used by said pellet producing means.

4. The system claimed in claim 1 wherein said calculating means repeatedly calculates a feeder change value for use in determining said dry material input value, derived from a change in said power and from said change in said dry material input value.

5. The system claimed in claim 4 wherein said calculating means calculates said feeder change value from a ratio of said change in said power to said change in said dry material input value.

6. The system claimed in claim 4 wherein said calculating means calculates said dry material input value and said steam input value also based on said feeder change value.

7. The system claimed in claim 1 wherein said calculating means repeatedly calculates a steam change value for use in determining said steam input value, derived from a change in said temperature and from said change in said steam input value.

8. The system claimed in claim 7 wherein said calculating means calculates said steam change value from a ratio of said change in said temperature to said change in said steam input value.

9. The system claimed in claim 1 wherein said calculating means repeatedly compares said sampled power value with a predetermined power tolerance value and calculates said current dry material input value only if said tolerance value is exceeded.

10. The system claimed in claim 1 wherein said calculating means repeatedly compares said sampled temperature value with a predetermined temperature tolerance value and calculates said current steam input value only if said tolerance value is exceeded.

11. The system of claim 1 further comprising a timer in communication with said calculating means, such that said calculating means permits each adjustment to stabilize before further adjustments are made.

12. An automatic control system for controlling the inputs to a pellet mill that has a means for moistening dry pellet material with moisture in the form of steam and a means for producing pellets composed of dry material and moisture, comprising:
    means for measuring the temperature in said pellet mill;
    means for measuring the power used by said pellet producing means;
    data storage means for storing past values of said inputs, said temperature, and said power;
    first calculating means for periodically receiving power values from said power measuring means, and for calculating a dry material input change value derived from a ratio of a change in said power to a change in said dry material input value, and for using said dry material input change value to calculate a current dry material input value;
    second calculating means for periodically receiving temperature values from said temperature measuring means, and for calculating a steam input change value derived from a ratio of a change in said temperature to a change in said steam input value, and for using said steam input value to calculate a current steam input value; and
    means for adjusting said pellet producing means and said moistening means based on said dry material input change value and said steam input change value.

13. The system claimed in claim 12 wherein said power measuring means measures power by measuring the current load of said pellet producing means.

14. The system claimed in claim 12 and further comprising a timer in communication with said first calculating means, such that said calculating means permits a prior adjustment to stabilize.

15. The system claimed in claim 12 wherein said data storage means further stores a predetermined tolerance value for said power, and further comprising a third calculating means for comparing a current power measurement with said tolerance value.

16. The system claimed in claim 12 wherein said data storage means further stores a predetermined tolerance value for said temperature and further comprising a third calculating means for comparing a current temperature measurement with said tolerance value.

17. The system claimed in claim 12 wherein said current input value is the sum of a preceding input value and said change value.

18. An automatic control system for preventing plugging of a pellet mill that has a means for moistening dry pellet material with moisture in the form of steam and has a means for producing pellets composed of dry material and moisture in the form of steam, comprising:
    means for measuring the power used by said pellet producing means;
    calculating means for continually receiving power values from said power measuring means and for calculating a plug indication value that indicates that said pellet producing means is likely to become plugged, wherein said plug indication value is based on said power values, and wherein, using said power measurements, said calculating means calculates the change in said power during a past time interval, calculates a margin, and compares said change to said margin;
    interface means for providing an interface between said pellet mill and said calculating means, wherein said interface means converts the output of said means for measuring power into digital signals, and converts the output of said calculating means into adjustment signals in response to said plug indication value; and
    means for interrupting said supply of pellet material to said pellet producing means and for shutting off said steam supply, based on said adjustment signals.

19. The system claimed in claim 18, wherein said calculating means repeatedly compares a current sampled power value to a predetermined target value and performs said margin comparison only if said current power value exceeds said target value.

20. The system claimed in claim 18 wherein said calculating means calculates said margin in response to the difference between a current power value and a predetermined overload value.

21. A method for automatically controlling a pellet mill that has a means for moistening dry pellet material with moisture in the form of stem and a means for producing pellets composed of dry material and moisture, comprising the steps of:

periodically measuring the temperature in said pellet mill;

periodically measuring the power used by said pellet producing means;

determining the effects of past adjustments to dry material input and steam input on said temperature and said power;

calculating a current dry material input value and a current steam input value, wherein said input values are based on the results of said step of determining effects of past adjustments; and adjusting said dry material input and said steam input in response to said input values.

22. The method claimed in claim 21 wherein said power measuring step includes measuring the current load of said pellet producing means.

23. The method claimed in claim 21 wherein said dry material calculating step includes limiting said calculation with a predetermined target power in said pellet producing means.

24. The method claimed in claim 21 wherein said step of determining effects of past adjustments includes timing the occurrence of adjustments so that said past adjustments begin to stabilize.

25. The method claimed in claim 21 wherein said step of determining the effect of past adjustments in said dry material input comprises obtaining a ratio of a change in said power to a change in said dry material input.

26. The method claimed in claim 21 wherein said step of determining the effect of past adjustments to said steam input comprises obtaining a ratio of a change in said temperature to a change in said steam input.

27. The method claimed in claim 21 and further comprising the step of comparing said measured power value to a predetermined tolerance value.

28. The method claimed in claim 27 wherein said step of calculating a current dry material input value is performed prior to the calculation of said steam input value and said steam input is adjusted only when said power is within tolerance.

29. The method claimed in claim 21 and further comprising the step of comparing said measured temperature value to a predetermined tolerance value.

30. A method for preventing plugging of a pellet mill that has a means for moistening dry pellet material with moisture in the form of steam and has a means for producing pellets composed of dry material and moisture in the form of steam, comprising the steps of:

obtaining a data stream of values representing the power used by said pellet producing means;

calculating a change in said power use during a past time interval;

comparing said change in said power to a margin based on the difference between a current power measurement and a predetermined overload value;

generating a signal to said pellet mill when said change exceeds said margin; and interrupting said supply of pellet material to said pellet producing means in response to said signal generating.

* * * * *